(12) United States Patent  
Boasso et al.

(10) Patent No.: US 7,214,028 B2
(45) Date of Patent: May 8, 2007

(54) METHOD AND APPARATUS FOR SUPPLYING BULK PRODUCT TO AN END USER

(75) Inventors: Walter J. Boasso, Arabi, LA (US); Stephen Benet, Channelview, TX (US)

(73) Assignee: Boasso America Corporation, Chalmette, LA (US)

( * ) Notice: Subject to any disclaimer, the term of this patent is extended or adjusted under 35 U.S.C. 154(b) by 205 days.

(21) Appl. No.: 10/610,357

(22) Filed: Jun. 30, 2003

(65) Prior Publication Data

US 2005/0260062 A1    Nov. 24, 2005

Related U.S. Application Data

(63) Continuation-in-part of application No. 10/313,906, filed on Dec. 6, 2002, now abandoned.

(60) Provisional application No. 60/372,568, filed on Apr. 15, 2002.

(51) Int. Cl.
B60P 1/16 (2006.01)

(52) U.S. Cl. ..................................... 414/812
(58) Field of Classification Search .............. 414/812, 414/406, 414, 441
See application file for complete search history.

(56) References Cited

U.S. PATENT DOCUMENTS

| 2,606,676 A | 8/1952 | Dempster |
| 3,032,227 A | 5/1962 | Guralnick et al. |
| 3,384,122 A | 5/1968 | Harpman |
| 3,547,391 A | 12/1970 | Batterton et al. |
| 3,687,319 A | 8/1972 | Adam et al. |
| 3,743,108 A | 7/1973 | Visser |
| 3,985,254 A | 10/1976 | Grandury |
| 4,111,314 A | 9/1978 | Nelson |
| 4,163,626 A | 8/1979 | Batterton et al. |
| 4,214,684 A | 7/1980 | Galowitz |
| 4,226,565 A | 10/1980 | Lipp |

(Continued)

FOREIGN PATENT DOCUMENTS

DE    1455635    6/1969

(Continued)

*Primary Examiner*—Charles A. Fox
(74) *Attorney, Agent, or Firm*—Garvey, Smith, Nehrbass & North, L.L.C.; Brett A. North

(57) ABSTRACT

A method and apparatus for supplying bulk material to an end user includes the step of providing a bulk material source that is at a location distant from the end user and a specially configured vessel and trailer apparatus for transporting the bulk material to the end user. The vessel is filled with bulk material at the bulk material source and then transported with a specially configured trailer. Alternatively, at source or destination, the vessel can remain as a temporary storage device, free-standing from the trailer. During transport between the bulk material source and the end user, the vessel is filled or partially filled with a selected bulk material. During transport, the vessel is in a generally horizontal position, supported by the trailer and a specially configured elevator. The vessel is unloaded from the trailer by moving the vessel longitudinally along the trailer and by transferring the vessel from a generally horizontal position upon the trailer to an elevated upright position.

87 Claims, 23 Drawing Sheets

U.S. PATENT DOCUMENTS

| | | | |
|---|---|---|---|
| 4,266,510 A | 5/1981 | Rowan et al. | |
| 4,268,208 A | 5/1981 | Hankins et al. | |
| 4,337,014 A | 6/1982 | Farnham | |
| 4,348,146 A | 9/1982 | Brock | |
| 4,465,420 A | 8/1984 | Dillman | |
| 4,529,349 A | 7/1985 | Lutz | |
| 4,561,821 A | 12/1985 | Dillman | |
| 4,621,972 A | 11/1986 | Grotte | |
| 4,626,166 A | 12/1986 | Jolly | |
| 4,634,335 A | 1/1987 | van den Pol | |
| 4,704,062 A | 11/1987 | Hale | |
| 4,708,569 A | 11/1987 | Nijenhuis | |
| 4,775,275 A | 10/1988 | Perry | |
| 4,810,159 A | 3/1989 | Stegmuller | |
| 4,848,619 A | 7/1989 | Corompt | |
| 4,855,960 A * | 8/1989 | Janssen et al. | 366/8 |
| 4,925,358 A * | 5/1990 | Cook | 414/685 |
| 4,944,646 A | 7/1990 | Edwards et al. | |
| 4,956,821 A | 9/1990 | Fenelon | |
| 4,963,070 A | 10/1990 | Detrick | |
| 4,983,089 A | 1/1991 | Rose | |
| 4,986,719 A | 1/1991 | Galbreath | |
| 5,044,861 A | 9/1991 | Kirchhoff et al. | |
| 5,069,507 A | 12/1991 | Lindsey | |
| 5,082,416 A | 1/1992 | Bock | |
| 5,088,825 A | 2/1992 | Derry et al. | |
| 5,183,371 A | 2/1993 | O'Daniel | |
| 5,339,996 A | 8/1994 | Dubbert et al. | |
| 5,417,540 A | 5/1995 | Cox | |
| 5,474,379 A | 12/1995 | Perry | |
| 5,601,393 A | 2/1997 | Waldschmitt | |
| 5,626,253 A | 5/1997 | Schutz | |
| 5,634,716 A | 6/1997 | Westall et al. | |
| 5,634,764 A | 6/1997 | Replogle | |
| 5,678,978 A | 10/1997 | Markham | |
| 5,769,281 A | 6/1998 | Bates | |
| 5,797,676 A | 8/1998 | Furlani | |
| 5,823,375 A | 10/1998 | Nessfield | |
| 5,911,337 A | 6/1999 | Bedeker | |
| 5,944,470 A | 8/1999 | Bonerb | |
| 5,967,655 A | 10/1999 | Hills | |
| 6,139,241 A | 10/2000 | Craig et al. | |
| 6,158,602 A * | 12/2000 | Zakula et al. | 212/270 |
| 6,292,689 B1 | 9/2001 | Wallace et al. | |
| 6,293,689 B1 | 9/2001 | Guntert, Jr. et al. | |
| 6,311,438 B1 | 11/2001 | Haquette | |
| 6,311,821 B1 | 11/2001 | Douglas | |
| 6,364,153 B1 * | 4/2002 | Petzitillo et al. | 220/812 |
| 6,503,041 B2 | 1/2003 | Van Gorp | |
| 2001/0008604 A1 | 7/2001 | Gorp | |
| 2002/0007602 A1* | 1/2002 | Corcoran | 52/122.1 |

FOREIGN PATENT DOCUMENTS

| | | |
|---|---|---|
| DE | 2441911 | 3/1976 |
| DE | 3109-364 | 11/1982 |
| DE | 3312508 | 11/1984 |
| FR | 1.168.749 | 12/1958 |
| PL | 54400 | 12/1967 |

* cited by examiner

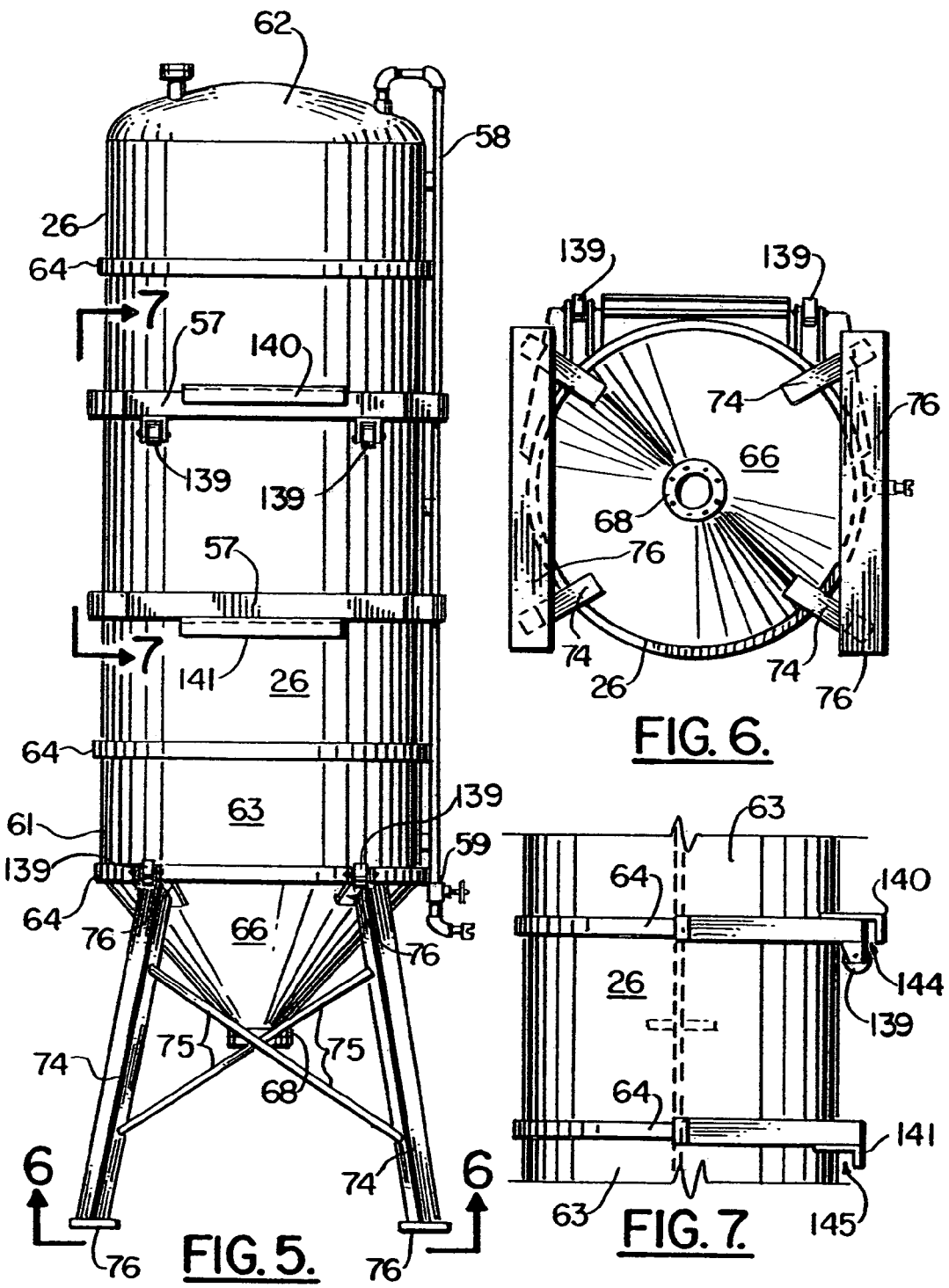

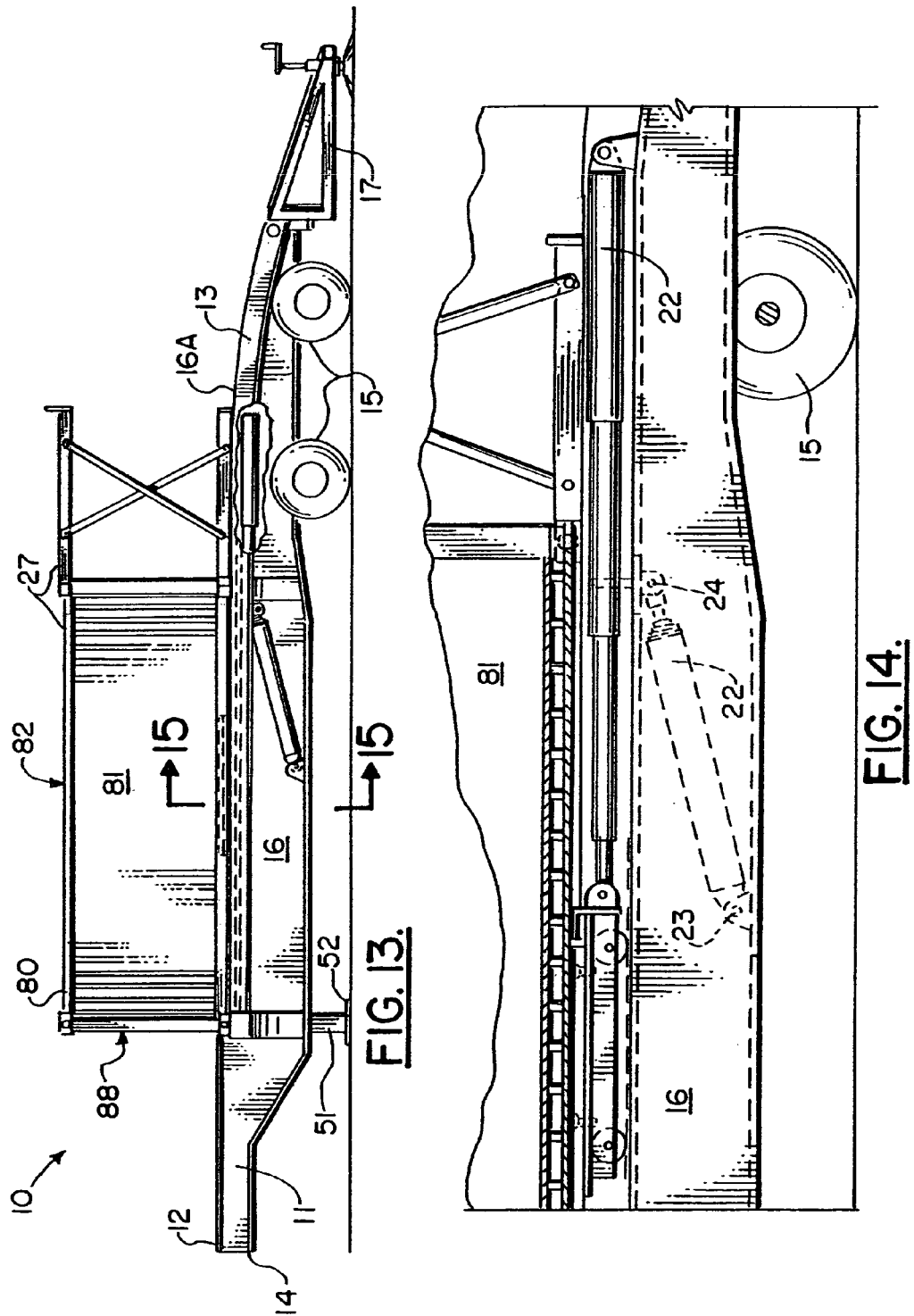

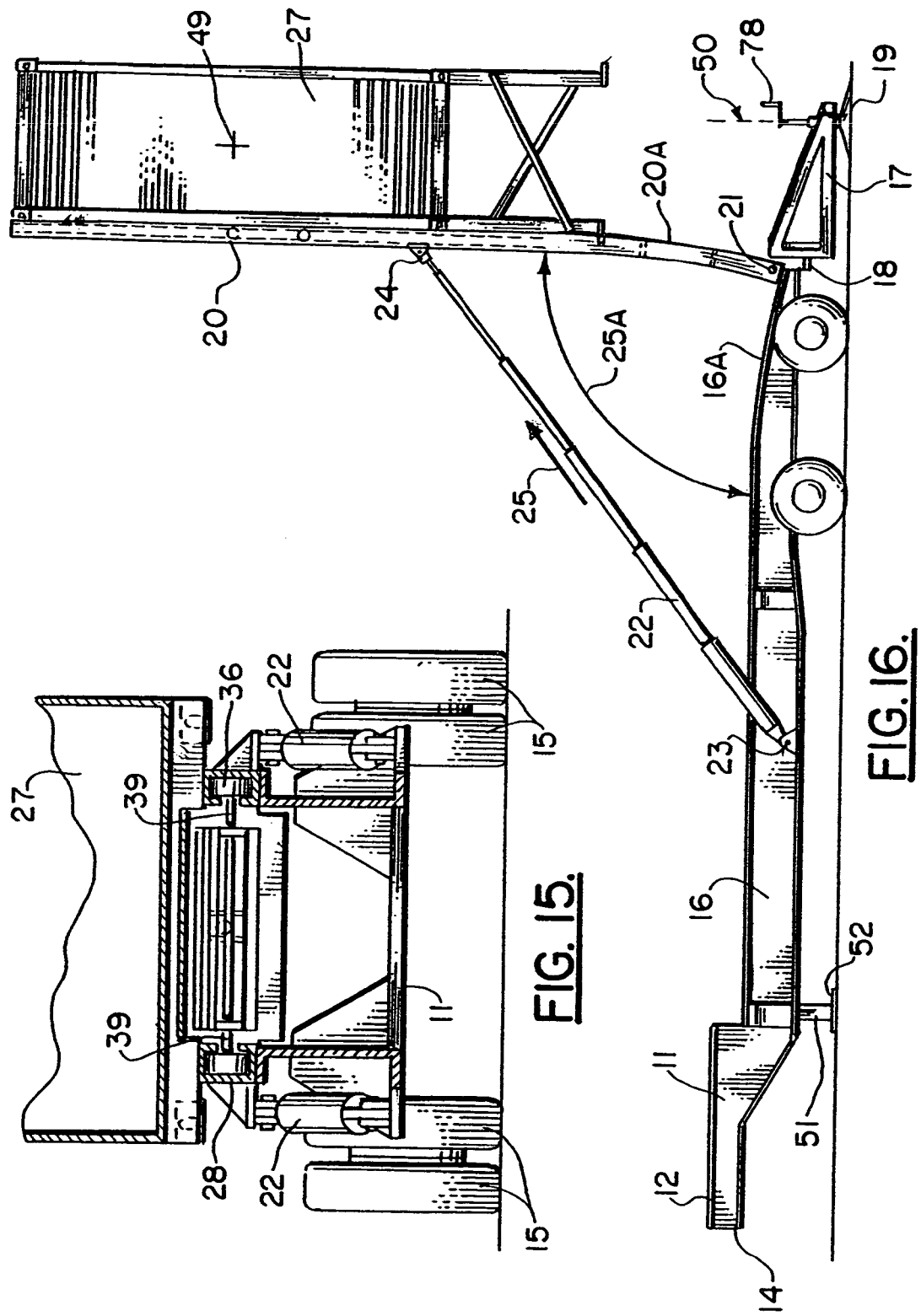

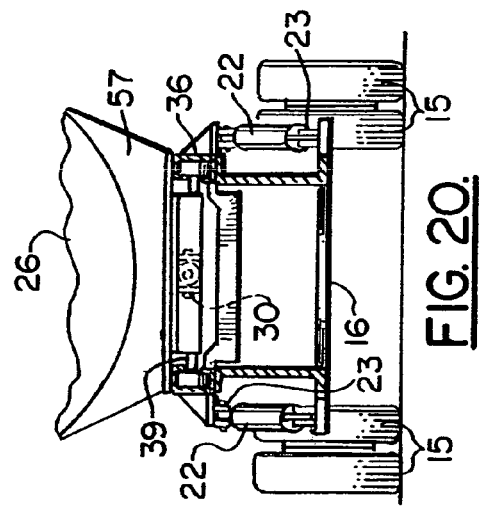
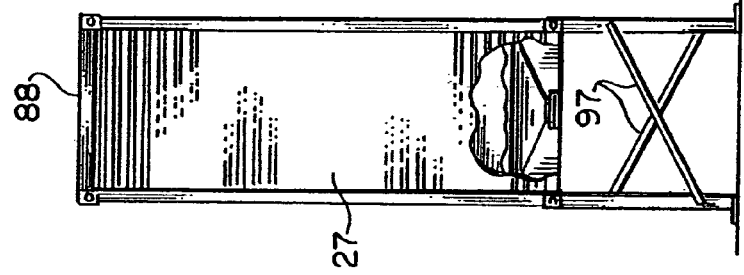
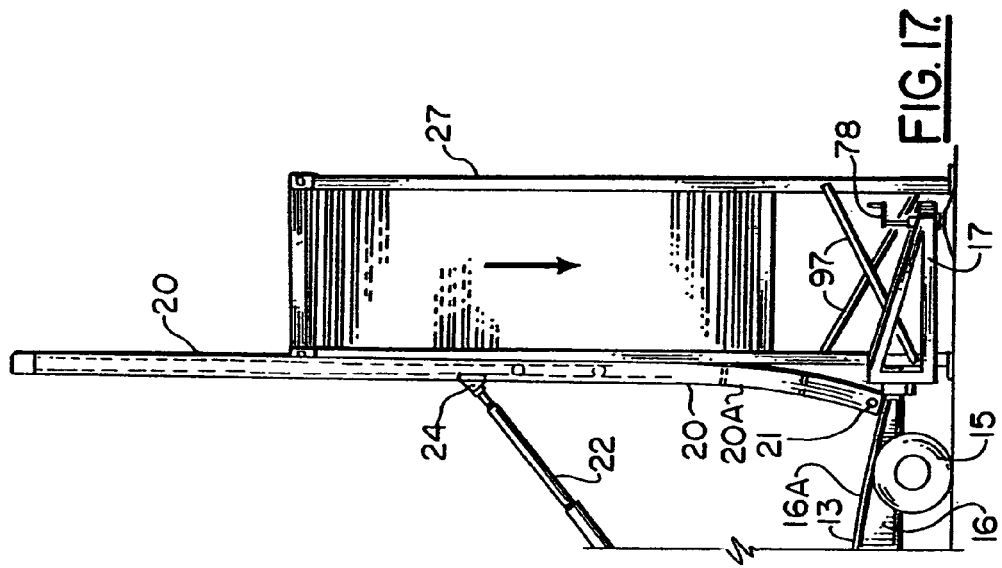

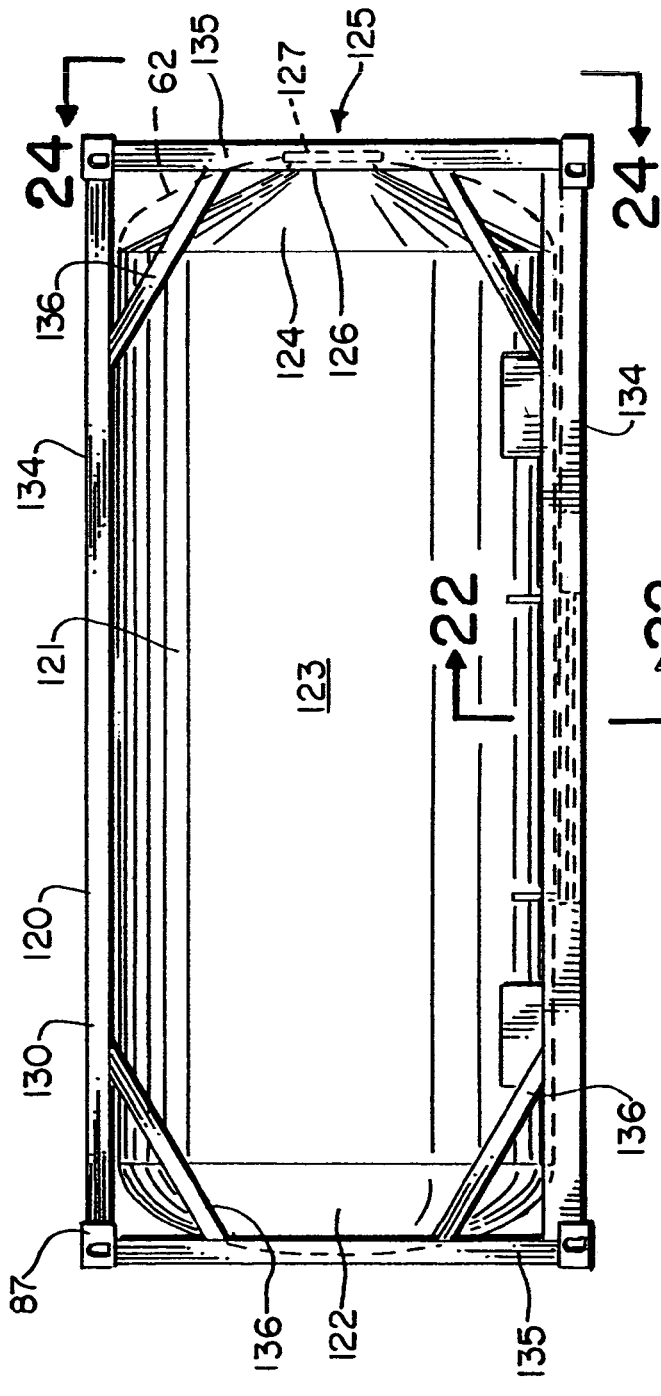
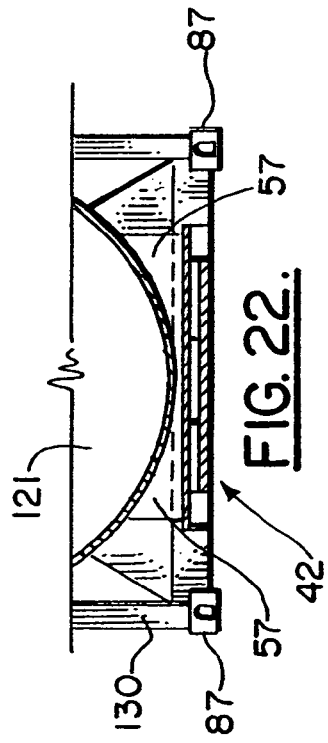
FIG. 21.
FIG. 22.

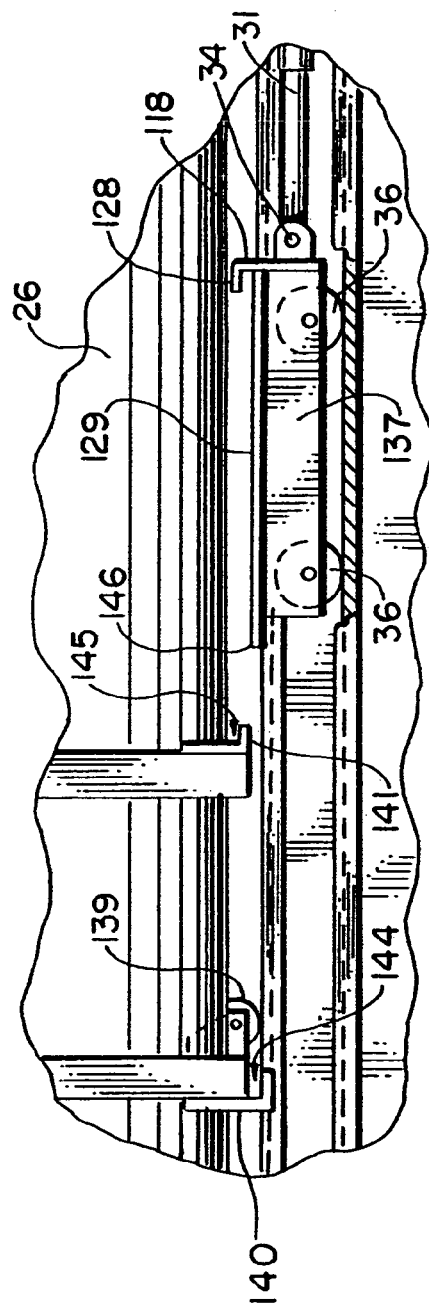
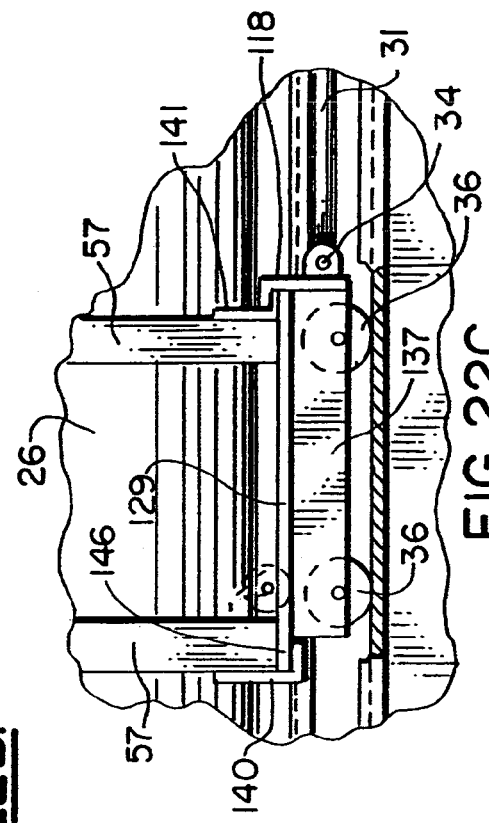
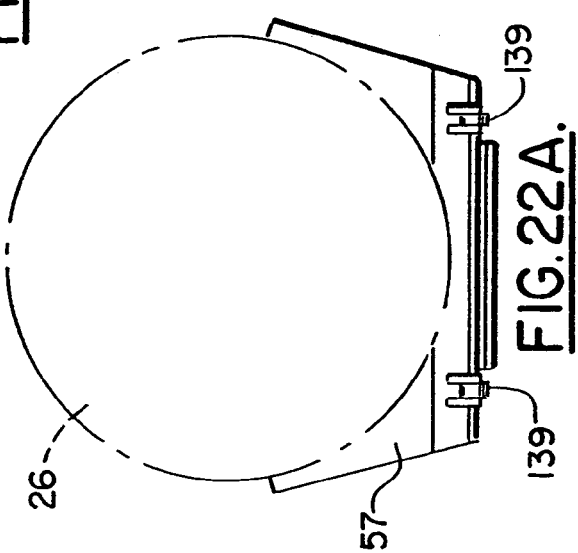

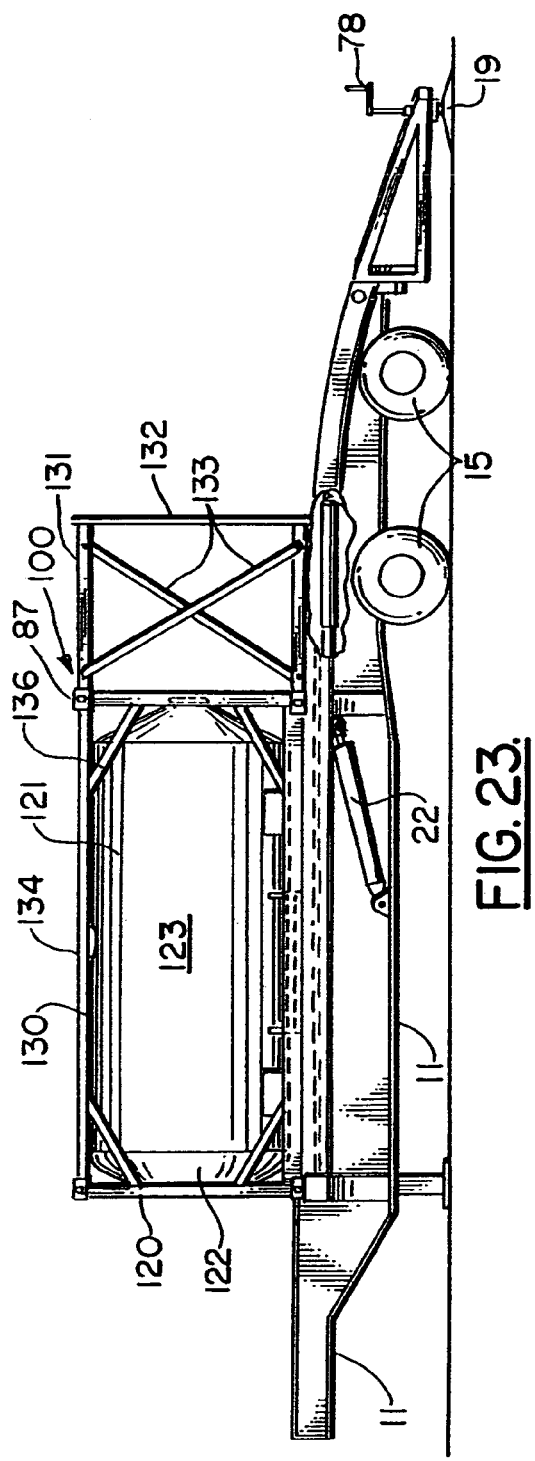
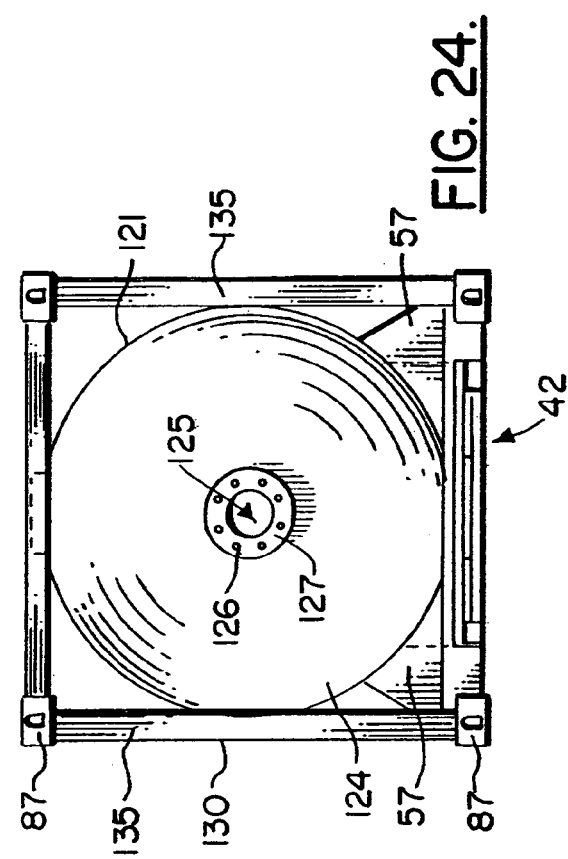

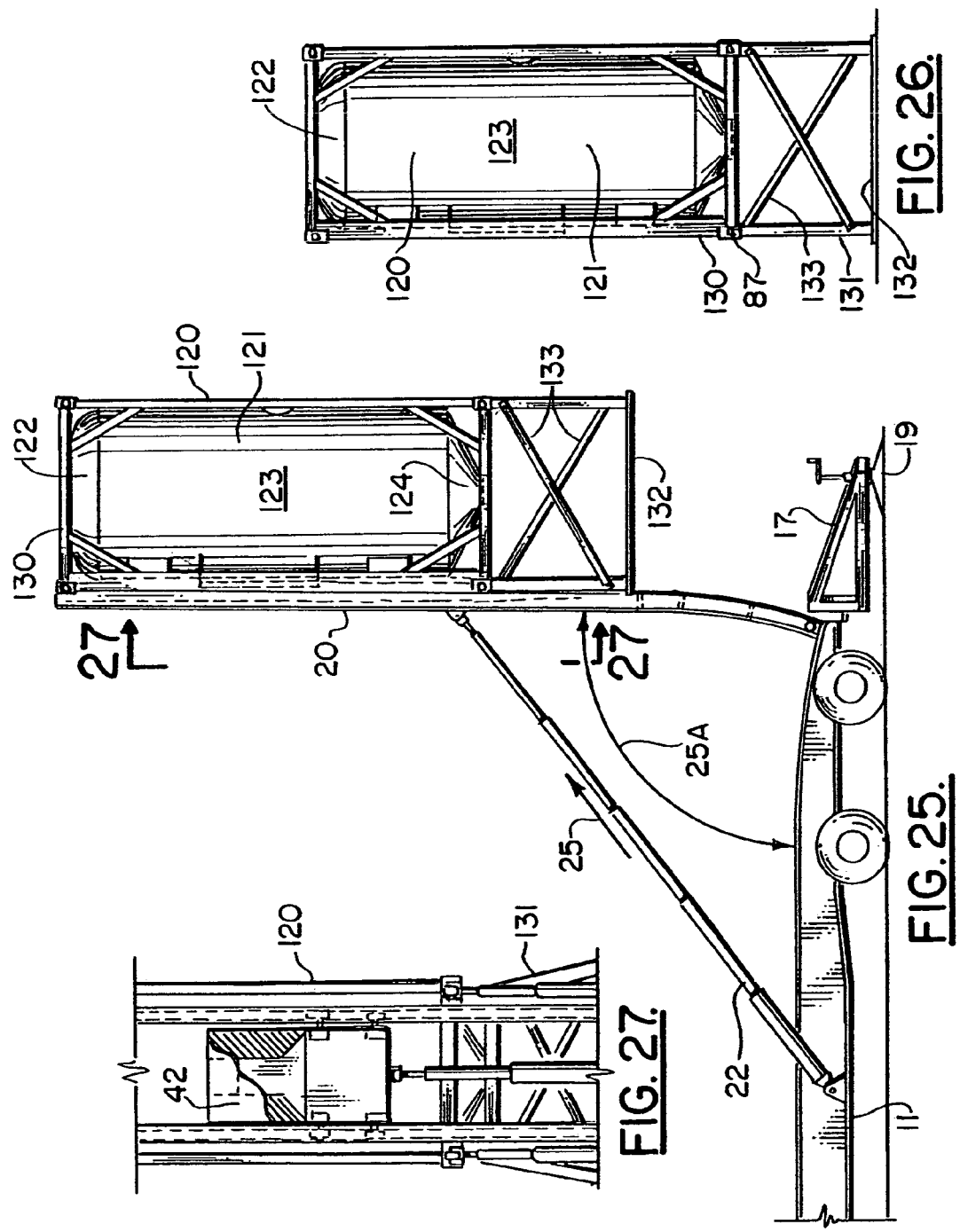

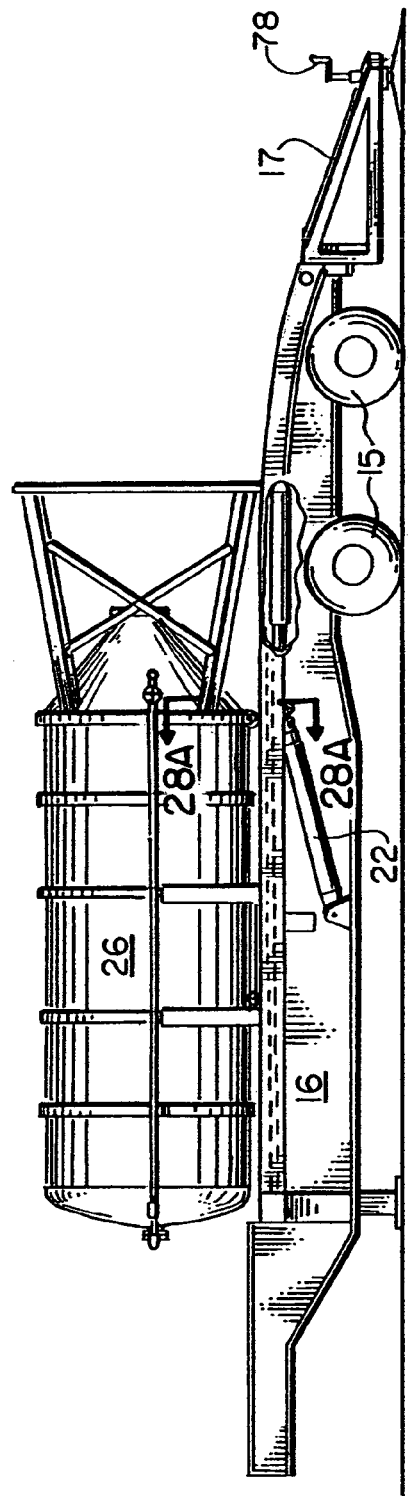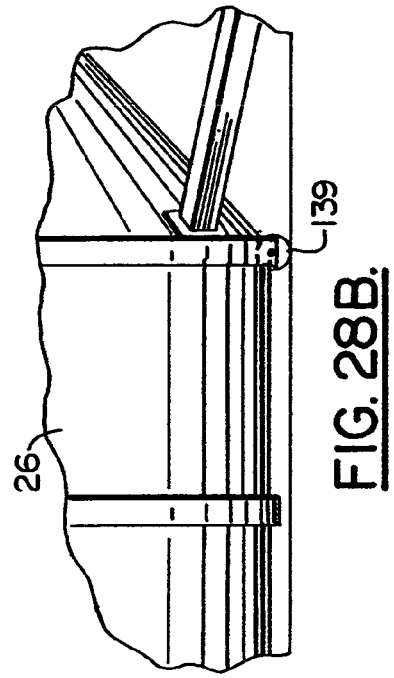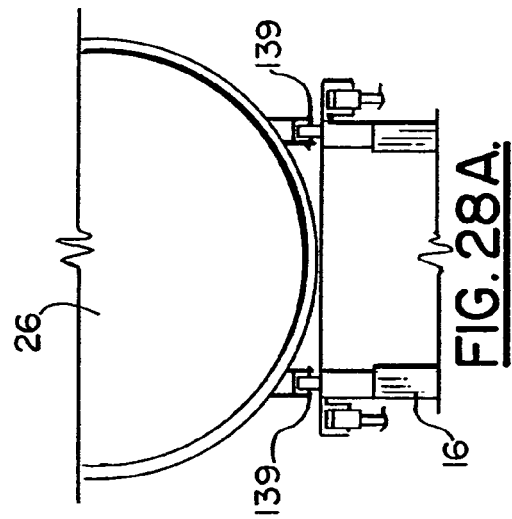

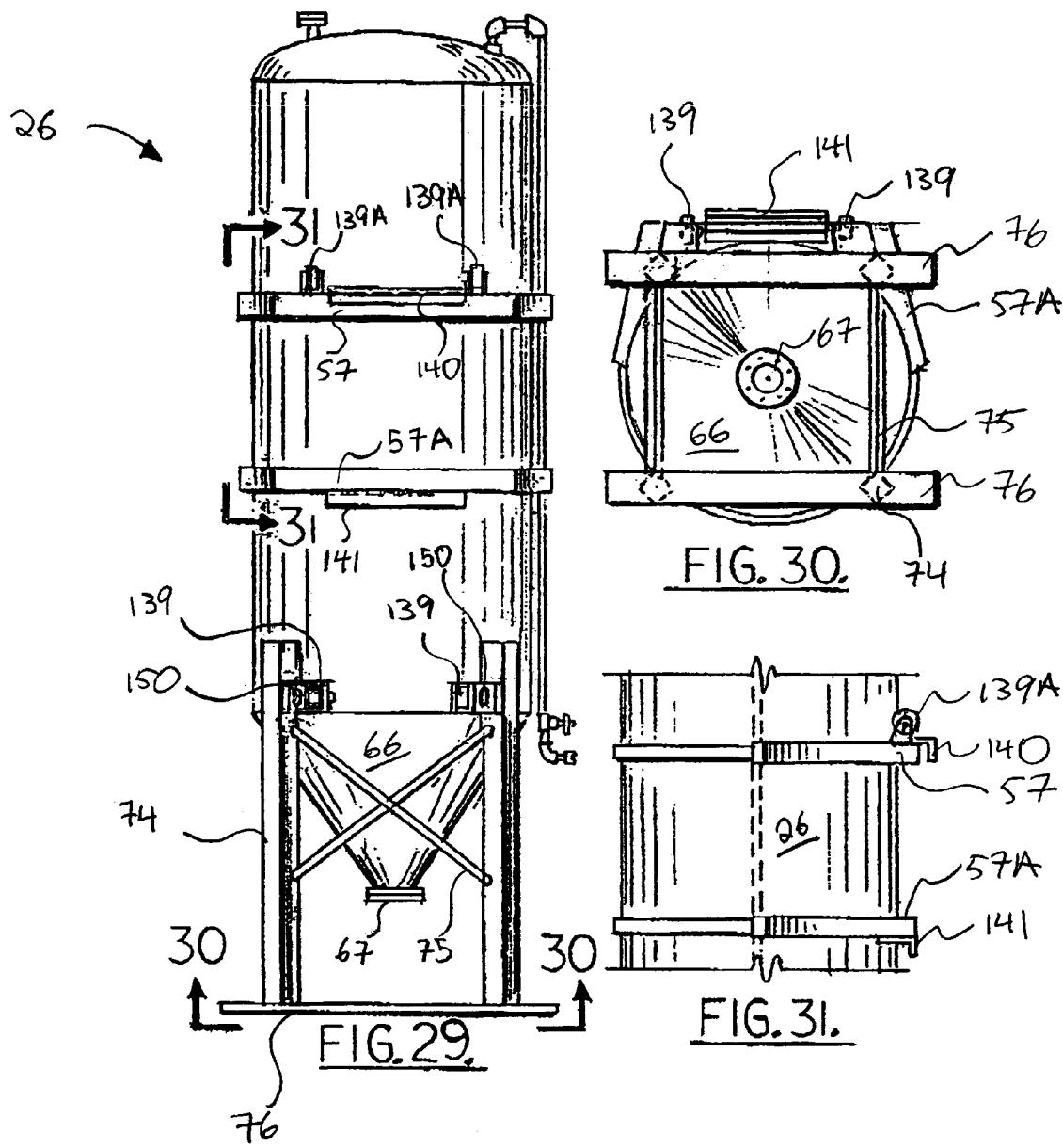

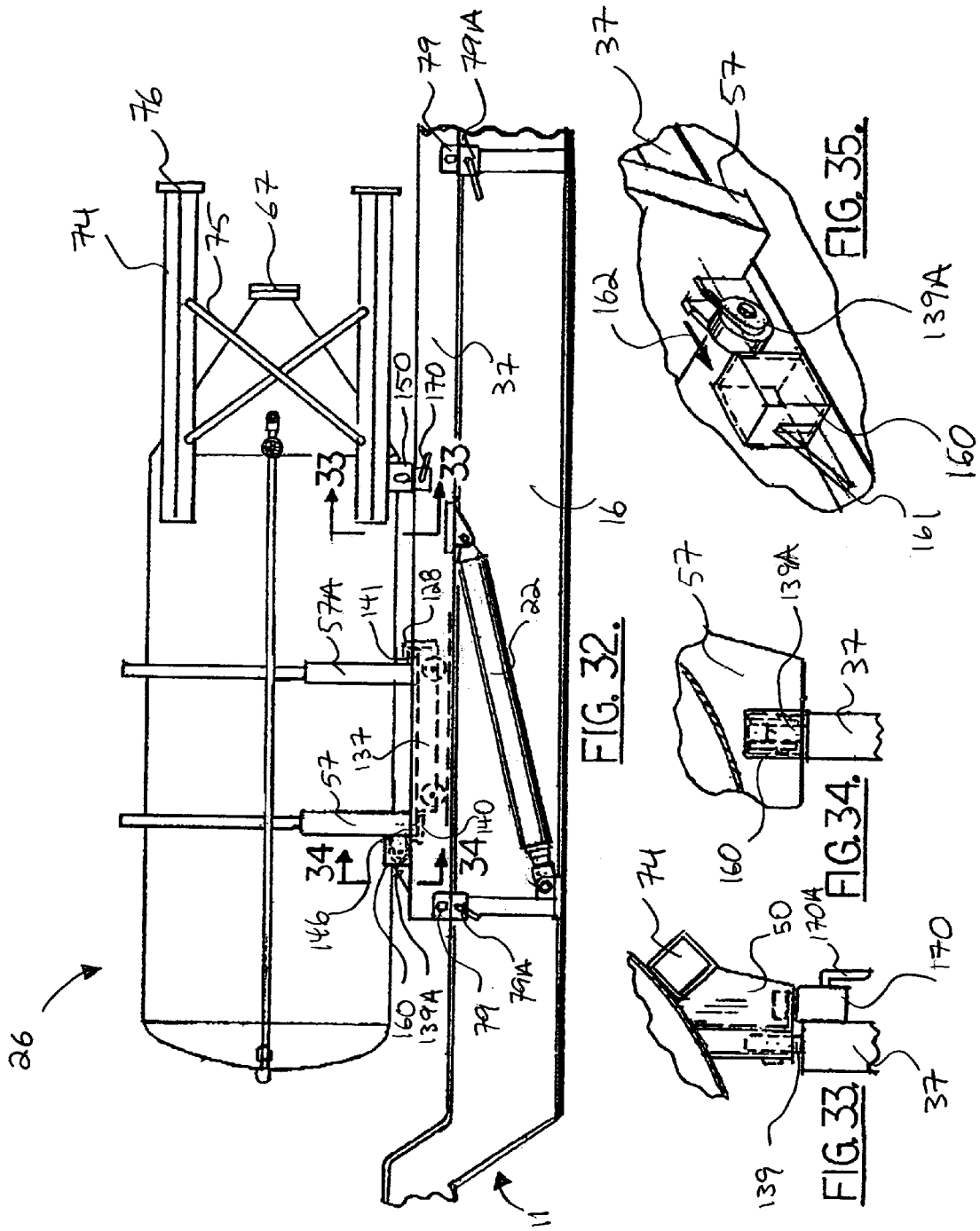

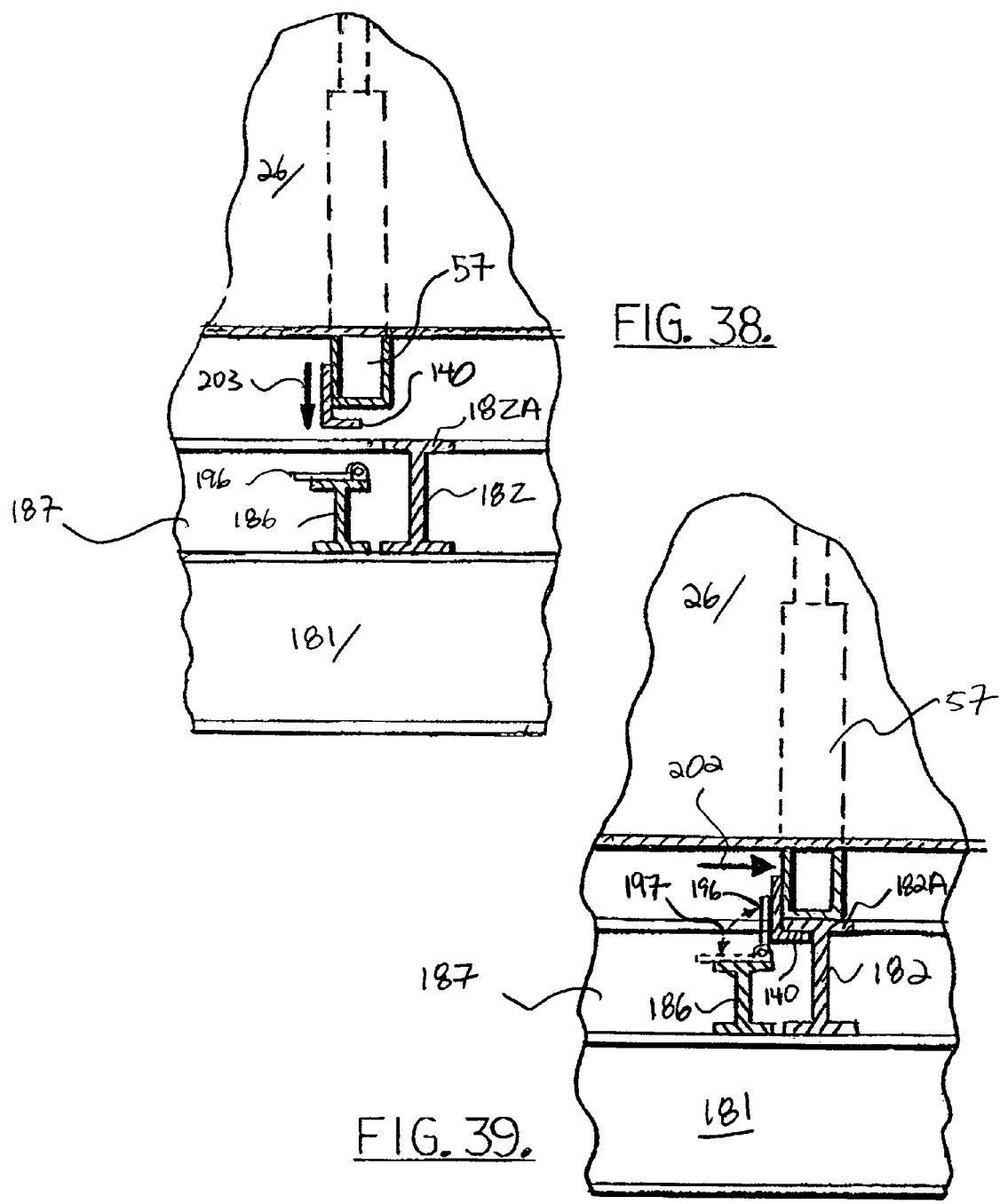

METHOD AND APPARATUS FOR SUPPLYING BULK PRODUCT TO AN END USER

CROSS-REFERENCE TO RELATED APPLICATIONS

This is a continuation-in-part of U.S. patent application Ser. No. 10/313,906, filed on Dec. 6, 2002, now abandoned which is incorporated herein by reference which claimed priority to U.S. Provisional Patent Application Ser. No. 60/372,568.

Priority of U.S. Provisional Patent Application Ser. No. 60/372,568, filed Apr. 15, 2002, incorporated herein by reference, is hereby claimed.

Priority of Patent Cooperation Treaty Patent Application No. PCT/US/03/04969, filed Feb. 15, 2003, incorporated herein by reference is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND

1. Field

The present invention relates to the trailer transport, and intermediate temporary storage, of bulk cargo from a bulk product source or bulk material source to an end user. More particularly, the present invention relates to an improved method and apparatus for supplying a bulk material to an end user wherein a specially configured trailer having a wheeled chassis (e.g., drop frame) and a moving elevator transports a loaded vessel between a bulk material source and an end user, the trailer being configured to cradle the vessel in a generally horizontal position during transport and to move the vessel from the generally horizontal position to a generally vertical position for end use. At the source or origin and/or at destination the vessel may be used for intermediate temporary storage after being filled completely or partially with bulk material. A number of different container/vessel configurations are disclosed.

2. General Background

Many dried bulk cargo materials are supplied from a bulk material source to an end user using huge transport vehicles such as railroad cars and tractor trailer rigs. These presently available transport systems ignore the need of many smaller and medium sized end users that do not require full railroad car loads or full tractor trailer loads of the bulk material.

Bulk bags can be used to carry many dry bulk materials from a supplier to an end user. However, these bulk bags are limited in their capacity to loads of about 2000 pounds or less.

While certain novel features of this invention shown and described below are pointed out in the annexed claims, the invention is not intended to be limited to the details specified, since a person of ordinary skill in the relevant art will understand that various omissions, modifications, substitutions and changes in the forms and details of the device illustrated and in its operation may be made without departing in any way from the spirit of the present invention. No feature of the invention is critical or essential unless it is expressly stated as being "critical" or "essential."

BRIEF SUMMARY

The present invention provides an improved method and apparatus for supplying a bulk material to an end user. The method includes providing a bulk material source that can be at a location distant from the end user and providing a specially configured trailer and vessel arrangement for transporting the bulk material to the end user. After being filled at the source, the vessel may remain in a freestanding approximately vertical position for a temporary period prior to transportation to the end user. When delivered to the end user, the vessel may remain in a freestanding approximately vertical position for a temporary period and after the transport trailer has departed.

Multiple improved vessel and like container configurations can be provided for use with the method and apparatus of the present invention. These self contained vessels can be pressured and can be reused and eliminate the need for warehouse space that is required when using bulk bags, gaylord boxes and the like. The lifting equipment associated with such boxes or bags can be eliminated. The present invention eliminate a need for bulk bags or pallets.

Because the invention can provide an intermediate or temporary storage before and after the transportation mode, the vessel can eliminate the need to construct permanent storage silos or buildings. When in the storage mode, the invention can allow the source of the bulk material to hold material after its production, but prior to its packaging, at a site some distance from the source providing a delayed-packaging benefit.

Environmental health hazards can be substantially reduced because the bulk material can remain inside the vessel from source to end user thereby eliminating the re-handling of the bulk material.

As part of the method, the vessel or pressure vessel is placed in a generally horizontal position upon the trailer and transported to the bulk material source. At the bulk material source, the vessel can be filled with the selected bulk material.

The vessel can be transported in a filled condition to the end user. The vessel can remain filled or partially filled during transit. During transit, the vessel is in a generally horizontal, reclined or lay down position upon the trailer.

The vessel, box container, or other container can be unloaded from the trailer in a special manner that includes the ability to move the vessel while filled with material in a generally horizontal direction thereby centering the loaded vessel on the trailer. The specially configured trailer can provide an elevator or elevating mast that moves the vessel from the generally horizontal position to an elevated position. One operator can load or unload the vessel.

The method can also include a lowering of the vessel from the generally upright, elevated position to a lowered, installed position that is behind the trailer.

The vessel can be loaded while in transport from the bulk material source to the end user with between about 1 and 50,000 pounds of bulk material.

The vessel can provide an upper bulk material holding section and a lower foundation section that does not hold any bulk material. Part of the bulk material holding section can be a lower end portion that is a conical or funnel shaped that facilitates unloading of material once the vessel or container reaches its final destination. Upon arrival at the final destination, the bulk product or bulk material can be unloaded in any number of ways including but not limited to: 1) gravity; 2) suction; or 3) pressurized or forced air delivery. The transport trailer can leave the vessel at the final destination and return at a later date or time (e.g., hours or days later). Upon return, the transport trailer can bring a second, bulk material filled vessel and leave it at the final destination, then retrieve the now empty first vessel.

The method of the present invention preferably employs a plurality of hydraulic cylinders or rams. These cylinders are used for multiple purposes, including sliding the vessel upon the trailer prior to its elevation, and elevating the vessel from a generally horizontal to a generally vertical position. Further, the same plurality of hydraulic cylinders or rams can be used to lower the vessel from an elevated to a lowered position while the vessel is in a vertical orientation. One or more hydraulic rams are preferably mounted on and move with the elevator.

As part of the method of the present invention, a vessel can be newly constructed or re-constructed from a standard, available tank container. Such tank containers typically comprise a cylindrically shaped pressure vessel or tank having dished end portions and surrounded by a box-like frame of structural steel members that are structurally connected to the vessel. As part of the method, the frame can optionally be removed from the vessel, or, the frame can remain with the vessel. One of the dished end portions can then be cut from the cylindrically shaped container or vessel. The end portion from which the dished end portion is removed can then be fitted with a funnel or cone that assists in dispensing material from the completed vessel. The vessels can alternatively be newly manufactured of any metal (e.g. stainless, carbon steel, steel, aluminum or other metal alloy), plastic, fiberglass; and can be lined or unlined.

If a tank container is to be converted, after removal of the box-like frame, the cylindrically shaped tank container can be fitted with a suitable structural base or foundation such as a plurality of legs that are cross-braced to support a load of between about 5,000 and 50,000 pounds. The completed vessel preferably has a volume of between about 500 and 2,000 cubic feet. The vessel can also have a longitudinal dimension of between about 10 and 45 feet (plus legs of any length up to approximately 120 inches) and a diameter of between 1 and 9 feet.

The present invention can use a number of different components in transporting bulk material to an end user.

The above discussed converted tank container, reconfigured with frame removed can be provided in any size, e.g. between 5 and 40 feet and fitted with fixed support legs.

A converted tank container can be reconfigured into e.g. a 20 or 40 foot vessel with the frame intact and not removed and fitted with detachable locking support legs.

A converted box container can be reconfigured into e.g. a 20 or 40 foot mobile vessel with detachable locking support legs.

Each of these containers is preferably designed to be loaded and transported in a horizontal position and then stood vertically for a final discharging or dispensing of the bulk material at the end users location.

The present invention thus provides an improved method and apparatus for transporting bulk material between a source and an end user, and/or temporarily storing the bulk material at the source or the destination. The apparatus includes a specially configured trailer that has a chassis (preferably drop frame type) and a masted elevator. The trailer is designed to both transport and erect any of the above-discussed different containers and vessels, each of which is designed to fit the specially configured trailer.

The specially configured trailer can include a masted elevator that is movably, preferably pivotally attached to the trailer chassis. The chassis can be an elongated trailer that is designed to be towed, providing a minimum of four wheels and preferably 8 wheels. The trailer is preferably provided with a minimum of (1–3) axles, each axle having between 2 and 4 wheels.

Special configured connectors can be provided on the elevator. The connectors include a projecting portion that is designed to fit in an interlocking fashion with a receptacle on the vessel, box container, or selected container. During use, the trailer can be loaded with an empty vessel that is preferably placed in a generally horizontal position. The vessel or container is then moved to the forward end portion of the trailer for purposes of load-centering and transport on the highway.

In order to move the vessel upon the trailer, hydraulic rams can activate to make a connection between the projecting portion on the elevator and the receptacle on the vessel or container. Extension of the hydraulic ram can then move the vessel or container toward the forward end portion of the trailer. The vessel or container can then be filled with the selected bulk cargo material, while the vessel is in a generally horizontal position, through openings located in the side wall of the vessel. Alternatively, the trailer can be loaded with a full or partially full vessel.

Alternatively at the location of the source of the bulk material, the hydraulic ram can move the vessel while in a horizontal position to the rear of the trailer. Hydraulic rams can elevate the masted elevator to the approximately vertical position. The dual purpose hydraulic ram that works to reposition the vessel longitudinally on the trailer also enables the vessel to be lowered vertically to the installed position for loading the vessel with bulk material in the approximately vertical position using e.g., a pressurized system. In one embodiment when the vessel is loaded the hydraulic rams are used to reverse the process. With the masted elevator in the elevated position, connecting apparatus on the masted elevator engage receiving apparatus on the vessel in the approximately vertical position. The dual purpose hydraulic ram can lift the vessel from its resting place and hydraulic rams can lower the masted elevator with vessel laying on it. When the vessel and mast are returned to the approximately horizontal position, the dual purpose hydraulic ram that lifts and lowers the vessel to and from the installed position, can also be the ram that centers the vessel longitudinally on the trailer for the transportation mode.

Once connected and loaded with cargo, the vessel and elevator can be moved together from the horizontal, transport position to a vertical, elevated position.

It should be understood that as part of the method of the present invention, the vessel or container can be filled with a selected bulk material from the time that the material is added to the vessel or container at a bulk material source until it reaches an end user. Thus, the present invention can not merely be an apparatus designed to move only an empty vessel or container, but rather can also provide a method and apparatus that can be used for transporting a vessel which is filled or partially filled with bulk material along highways from a material source to an end user.

Upon delivery, the transport trailer can depart and the vessel or container can function as storage and dispensing vessel for the end user. The transport trailer can return later with a second full vessel after a first of the vessels has been emptied of its contents over time. In one embodiment, because special container configurations are handled by a specially configured trailer and lifting arrangement in an outdoor or indoor environment, product degradation and contamination can be eliminated by avoiding multiple handlings.

The specially configured vessels used with the method of the present invention can be fitted with an outlet valve and transport flowline that eliminates the need for any trough for offloading of bulk material. The use of the sealed vessel in combination with an exit valve and flowline can eliminate contamination potential and avoid health exposure.

Some bulk products or bulk materials can be hazardous, creating dust that can adversely affect the health of workers unless they are properly suited in coveralls and wearing respirators. In one embodiment, the present invention can minimize or eliminate such health exposure because it is a closed system during both loading and unloading.

The present invention can be used for liquid bulk products or liquid bulk materials. In such a situation, the vessel shown in FIG. 5 can be provided in an insulated or uninsulated configuration, and baffled or unbaffled. Such a vessel can be electrically heated, steam heated, or it can be refrigerated. As with the dry bulk product, one operator can load or unload the vessel at a selected end user's location. As with the dry bulk product method and apparatus, the vessels can be reusable, can be manufactured of any suitable structural material such as metal (carbon steel or stainless steel or aluminum or other alloy), or fiberglass or plastic and can be lined or unlined.

As with the handling of dry bulk product or dry bulk material, when the apparatus and method of the present invention are used to handle liquid bulk product, each of the vessels can be self contained, requiring no additional equipment for lifting or handling as is often required for intermediate bulk containers (IBC) and/or 55–85 gallon drums. For liquid bulk handling, the present invention can eliminate environmental exposures that relate so often to drum disposal. The apparatus of the present invention can provide a method and apparatus for offloading the vessels in a filled position as opposed to empty.

The reusable method and apparatus of the present invention can be more cost effective than present intermediate bulk containers (IBCs). The present invention can eliminate product degradation because the product is only handled once. The present invention can eliminate contamination that can be caused by second handlings. The present invention can minimize or eliminate the necessary or required health exposure precautions where it is a closed system during both unloading and loading.

With the present invention shippers can achieve both efficient transportation and efficient intermediate temporary storage in one (or uni-vessel) thereby creating a new category of Uni-vessel Intermediate Bulk Containers (UIBC) for which the present invention can become a standard of measure.

In an alternate embodiment a trailer—rail—trailer system is disclosed wherein a trailer can transport a vessel to a first terminal, a special rail frame can be attached to the vessel enabling a rail car to transport the vessel from a first to a second terminal and a trailer can transport the vessel from the second terminal to a worksite.

BRIEF DESCRIPTION OF THE DRAWINGS

For a further understanding of the nature, objects, and advantages of the present invention, reference should be made to the following detailed description, read in conjunction with the following drawings, wherein like reference numerals denote like elements and wherein:

FIG. 5 is an elevation view of a preferred embodiment of the apparatus of the present invention showing the converted tank container vessel that can be used with the method of the present invention;

FIG. 6 is a bottom view of the vessel shown in FIG. 5, taken along lines 6—6 of FIG. 5;

FIG. 7 is a sectional view taken along lines 7—7 of FIG. 5 showing interlocking connectors on the tank container vessel and how they mate to FIG. 15a as seen in FIG. 22c;

FIG. 13 is a partial elevation view of a preferred embodiment of the apparatus of the present invention illustrating a trailer with a converted box container vessel in a generally horizontal transport position on the trailer;

FIG. 14 is an enlarged fragmentary sectional elevation view of the apparatus shown in FIG. 13, illustrating the trailer and vessel and hydraulic ram portions thereof, taken along lines 15—15 of FIG. 13;

FIG. 15 is a sectional view taken along lines 15—15 of FIG. 13;

FIG. 16 is a side view of a preferred embodiment of the apparatus of the present invention illustrating a movement of the elevator and a supported box container vessel from a horizontal to a vertical position;

FIG. 17 is a partial side view of the apparatus in FIG. 16 illustrating a lowering of the vessel to an underlying support surface;

FIG. 18 is an elevation view of the vessel that is shown being unloaded standing vertically and detached from the trailer in FIG. 17;

FIG. 20 is a partial end view of a preferred embodiment of the apparatus of the present invention illustrating the use of a converted tank container vessel when connected to the transport apparatus;

FIG. 21 is a side view of a converted tank container vessel with frame attached;

FIG. 22 is a sectional view taken along lines 22—22 of FIG. 21 illustrating the plate connection method utilized and shown in FIGS. 19 & 19a;

FIG. 22A is a fragmentary end of the preferred embodiment of the apparatus of the present invention illustrating the position of counter balance load wheels attached to container saddle;

FIG. 22B is a fragmentary side, elevation view of the preferred embodiment of the apparatus of the present invention illustrating components prior to connection between container and masted elevator;

FIG. 22C is another fragmentary, side, elevation view of the preferred embodiment of the apparatus of the present invention illustrating components connected between container and masted elevator;

FIG. 23 is a side view illustrating the trailer and framed tank container vessel in transport position;

FIG. 24 is an end view of a framed tank container showing the added flanged opening fitted to the rear dished end allowing discharge when placed in the vertical position shown in FIG. 26;

FIG. 25 is a side view illustrating movement of a tank container vessel from a horizontal position upon the trailer to a substantially vertical elevated position;

FIG. 26 is an elevation view of the vessel that is shown being unloaded from the trailer in FIG. 25;

FIG. 27 is a sectional view taken along lines 27—27 of FIG. 25 illustrating the component relationship of the hydraulic rams and masted elevator;

FIG. 28 is a side elevation view of the preferred embodiment of the present invention illustrating the trailer holding the tank container vessel shown in FIG. 5;

FIG. 28A is a sectional view taken along lines 28A—28A of FIG. 28 illustrating components and counter balance load wheels relative to FIG. 28; and FIG. 28B is a fragmentary side view of the preferred embodiment of the present invention illustrating components and counter balance load wheels relative to FIG. 28.

FIG. 29 is a side view of an alternative embodiment of the present invention wherein the vessel has upper counterbalance wheels pointing upward towards the top of the vessel.

FIG. 30 is a bottom view of the vessel shown in FIG. 29 and taken from lines 30—30.

FIG. 31 is a side view of the vessel shown in FIG. 29 and taken from lines 31—31.

FIG. 32 is a side view of the vessel shown in FIG. 29 wherein the vessel is supported in a horizontal position by a trailer 11.

FIG. 33 is a sectional view of the vessel and trailer shown in FIG. 32 and taken along the lines 33—33.

FIG. 34 is a sectional view of the vessel and trailer shown in FIG. 32 and taken along the lines 34—34.

FIG. 35 is a fragmentary side view of the vessel and trailer shown in FIG. 32 and illustrating an upper counterbalance wheel entering a receptacle.

FIG. 38 is a sectional view illustrating the front female interlocking plate connecting to a cross brace for the rail frame.

FIG. 39 is a section view illustrating a locking plate interlocking the front female interlocking plate to the cross brace.

DETAILED DESCRIPTION OF ONE OR MORE PREFERRED EMBODIMENTS

Figure 1:
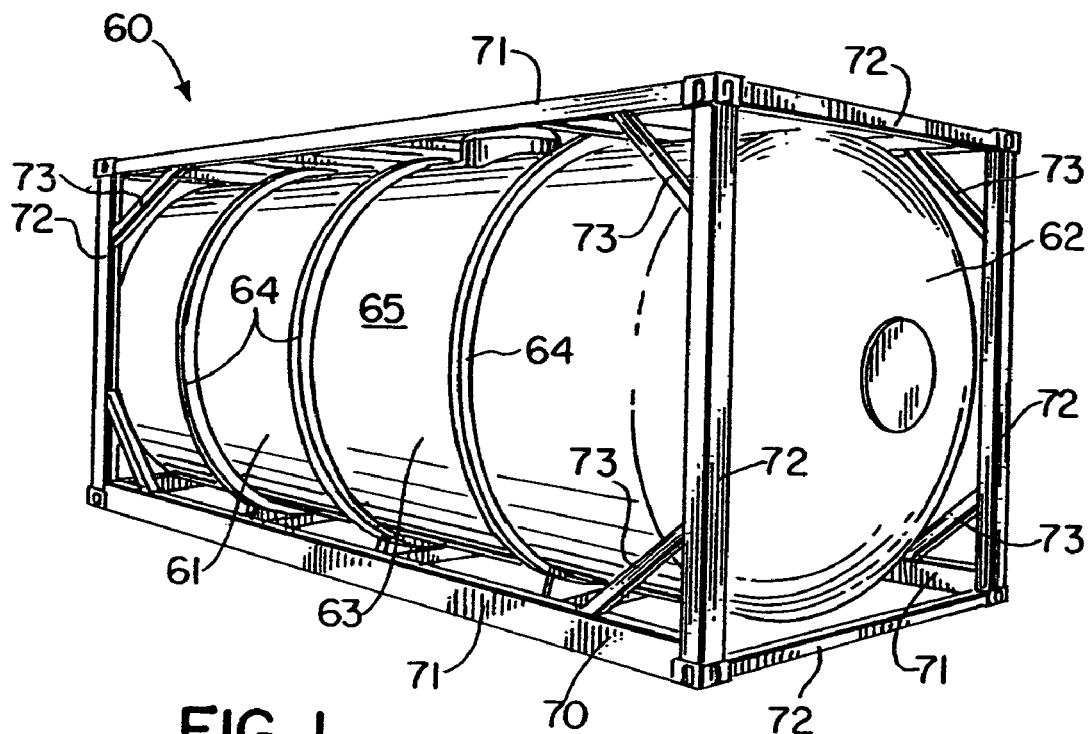
FIG. 1 is a partial perspective view of the preferred embodiment of the apparatus of the present invention showing a common tank container prior to conversion.

Detailed descriptions of one or more preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in any appropriate system, structure or manner.

FIGS. 13, 23 and 28 show various preferred embodiments of the bulk container transport apparatus of the present invention, designated generally by the numeral 10 in FIG. 13. Bulk container transport apparatus 10 provides a specially configured trailer/chassis 11, 16 having a front end portion 12 and a rear end portion 13. At the front end portion 12 there is provided a tongue 14 for connecting the trailer 111 to a tow vehicle such as a truck or tractor. The trailer 11 includes an elongated chassis 16 having a plurality of wheels 15. The trailer 11 preferably provides as many as three axles, each axle having between two and four wheels.

One or more sets of dolly legs 51 are mounted at the front of chassis 16 as shown in FIGS. 13 and 16. Each dolly leg 51 has a pivoting sand shoe 52 mounted at the bottom of dolly leg 51. A pair of dolly legs 51 are preferably provided. Each dolly leg 51 can form an angle of between about forty and ninety degrees (40–90°) with chassis 16. Alternatively, the dolly legs 51 can be angled outwardly (e.g. 30–45 degrees) to add lateral stability to the chassis 16 while being loaded or unloaded. The sand shoe 52 of the dolly leg 51 can be hingedly or pivotally attached to the dolly leg 51.

In FIGS. 15–20, the trailer 11 is shown as comprising generally chassis 11 and trailer 16 and a lifting mast or masted elevator 20. Trailer 111 and chassis 16 can be a drop deck chassis or other type trailer chassis combination. Chassis 16 at the rear end portion 13 of trailer 11 can provide either a straight tail section or the curved tail section 16A shown in FIGS. 13 and 16. Masted elevator 20 as shown in FIG. 16 provides a correspondingly shaped straight or curved tail section 20A. Corner castings 79 and locking twist-locks 79A secure the masted elevator to the chassis when masted elevator is in a generally horizontal position on the trailer during loading or storage (as shown in FIG. 15A). The curved tail sections 16A, 20A allow the elevator 20 when positioned generally vertically (see FIG. 17) to stand clear of the rear end of the chassis 16 at pivotal connection 21, creating clearance so that a vessel such as 26, 27 or 120 can be lowered to the ground behind the chassis 16 (see e.g., FIGS. 17 and 25.)

The masted elevator 20 is movable from a lay down, reclined or generally horizontal position as shown e.g. in FIGS. 13, 14, 15, 19 and 20 to a generally vertical position as shown e.g. in FIGS. 16, 17, 18 and 19A. When in an elevated, generally vertical position, the elevator 20 supports a vessel that can be either a newly constructed vessel or a converted tank container vessel 26 (FIGS. 5, 6, 7 and 28, 28A, 28B), a converted box container vessel 27 with detachable support legs (FIGS. 8–12 and 16–18) or a converted tank container reconfigured into a vessel 120 with frame remaining and with detachable locking support legs (FIGS. 21–27).

Figure 19:
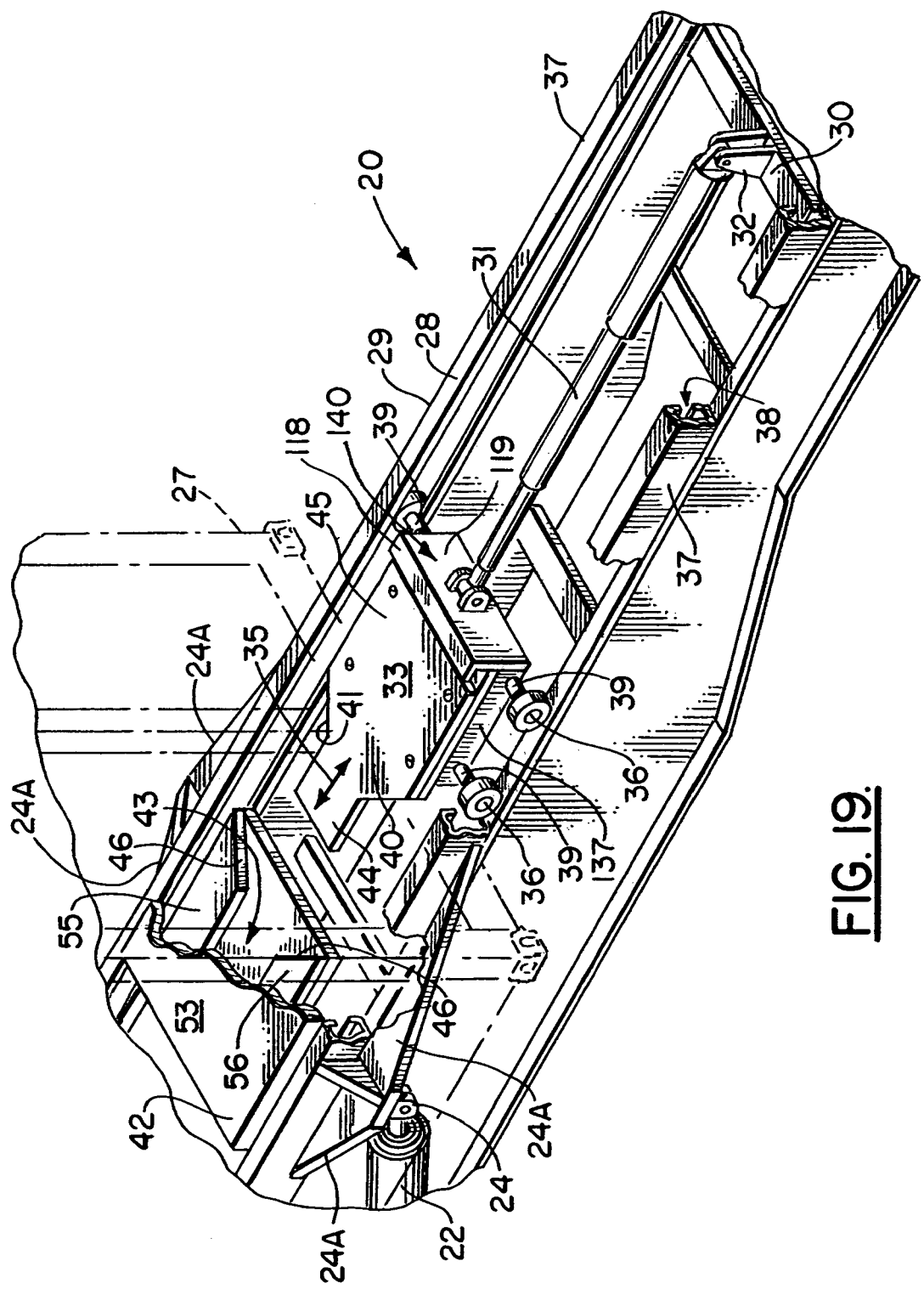
FIGS. 19–19A are partial perspective views of the preferred embodiment of the apparatus of the present invention illustrating the carriage assembly, hydraulic rams, load wheels, bolsters of variable length along the elevator portion, slotted track portions of mast for axles of load wheels, sleeve plates on box container and connection plate attached to the carriage assembly of the trailer chassis and elevator portions.
Figure 19A:
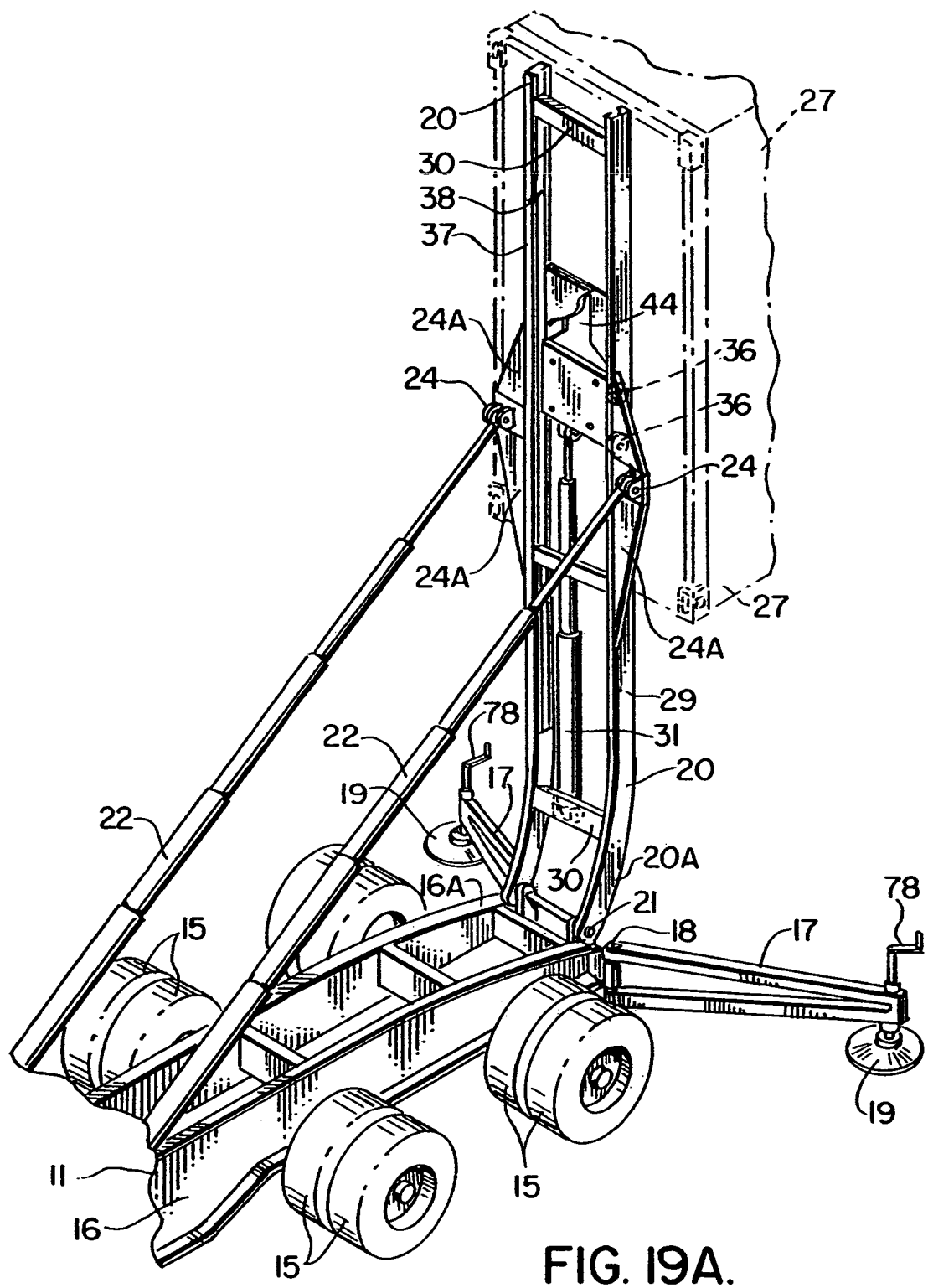

When the container elevator 20 is in the vertical position as shown e.g. in FIGS. 16, 17, and 19A, the trailer chassis 16 is preferably provided with load transfer outriggers 17 that are attached pivotally at connection 18 to trailer chassis 16. Each load transfer outrigger 17 can provide an adjustable foot 19 for engaging the underlying support surface, ground, concrete slab or the like adding stability during use.

Foot 19 is preferably connected to outrigger 17 with a jack 78 that enables the elevation of outrigger 17 to be changed relative to the ground surface. A hydraulic, pneumatic or hand crank or other operated jack mechanism 78 (see FIGS. 13, 16, 19A) can be used to elevate or lower an outrigger 17 relative to the feet 19 and the vertical position of the masted elevator 20 some distance off the ground, left or right of the centerline of the mast. By using the outriggers in this manner, vertical adjustment can be achieved by raising or lowering either or both (left or right outriggers 17. Vertical alignment or side-to-side alignment is therefore achieved allowing masted elevator 20 and a container to be properly fitted and lifted safely.

Such an adjustment to the elevator by an outrigger 17 relative to its foot 19 is made when the selected vessel 26, 27 or 120 is resting upon the ground or other underlying support surface (slab, floor, foundation, etc.) and masked elevator 20 has assumed the generally vertical position of FIG. 17. Illustrated in FIGS. 15A, 22A, and 22B, the lifting carriage assembly 137 that includes female interlocking plate 140 and front male interlocking section 146 of main plate 129 can then be aligned using jacks 78 to adjust elevation of either or both outriggers 17 with their interlocking counterparts on the tank container's male interlocking plate 141 at the rear and front female interlocking plate 144 at the front. Female interlocking plate 140 is comprised of lifting beam 118 and flange 119. The outriggers 17 are affixed to the rear 13 of chassis 16 and can be sized and shaped to fold when not in use against the back surface 48 of chassis 16. When folded to such a stored position, outriggers 17 can function as a bumper for chassis 16.

In the operating position shown e.g. in FIGS. 16, 17, 19A and 25, the outriggers 17 are positioned to create a tripod arrangement from the rear axle to the end of an outrigger at sand shoe 19. The length of each outrigger 17 is preferably at least long enough such that foot 19 extends beyond the center of gravity 49 of the suspended container, preferably by at least 50%. See e.g. FIG. 16, which shows that the extended position 50 of outrigger 17 is behind the center of gravity 49 of box container vessel 27. Adjusting the position of the outriggers 17 e.g. the degree of unfolded position from the trailer 11, and raising or lowering the height of the shoe plate(s) 19, allows the operator to reposition the masted elevator to the left or right of a precise vertical alignment to the support surface upon which the vessel 26, 27, 120 is at rest. The resultant lateral range of motion facilitates the re-engagement of the elevator 20 into the interlocking plates on the vessel and expedites the recovery of the vessel 26, 27, 120 from its stand-alone upright position to its lifting and reclining into the horizontal position on the trailer.

Masted elevator 20 is preferably pivotally connected to chassis 16 at pivotal connection 21 as shown e.g. in FIGS. 16 and 17. In order to elevate the selected vessel 26, 27, or 120 from a generally horizontal to a generally vertical position, one or more hydraulic rams 22 are provided that are preferably pivotally attached at pivotal connection 23 to chassis 16 as shown e.g. in FIG. 16. Each hydraulic ram 22 is also preferably pivotally attached at a pivotal connection 24 to bolsters 24A affixed to the outboard side of elevator 20. The bolsters 24A as seen in FIGS. 19 and 19A may run the length of the masted elevator from the pivotal point of connection 24 to the ram 22, to the pivotal point 21 at the rear 13 of the chassis 16.

Arrow 25 in FIGS. 16 and 25 schematically indicates the extension of the rams 22 when elevating the elevator 20 and connected vessel 27, 120 to the generally vertical position shown in FIGS. 16 and 25. Arrow 25A is a curved arrow that schematically illustrates the pivotal movement of masted elevator 20 and supported vessel 27, 120 from the generally horizontal transport position of FIGS. 13 and 23 to the elevated, upright and generally vertical position of FIGS. 16 and 25.

In FIGS. 19–19A, elevator 20 is shown as comprised of an elevator frame 28 that includes longitudinal beams 29 and transverse beams 30 and may be affixed generally diagonally in a criss-crossed manner rather than transverse. The elevator frame 28 supports a hydraulic ram 31 and lifting carriage assembly 137 as shown in FIGS. 15, 15A, 19, 19A.

As shown in FIGS. 15, 15A, 19–19A, a hydraulic ram 31 is preferably connected at one end portion to connecting frame 33 and lifting carriage assembly 137 and at the other end portion to a transverse beam 30 of elevator frame 28 at pivotal connection 32. Arrow 35 in FIG. 19 illustrates the sliding movement of lifting carriage assembly 137 upon elevator frame 28 as hydraulic ram(s) 31 extends or retracts. The lifting carriage assembly 137 can be supported by a plurality of rollers 36 that travel in rails 37. Additional load-bearing wheels (counter balance wheels) 139 attached to the container vessel 26, assist the main load-bearing wheels 36 of lifting carriage assembly 137 and are illustrated in FIGS. 28, 28A, and 28B. This combination of load-bearing wheels facilitates proper weight distribution over both internal and external surfaces of the masted elevator frame 20.

Rails 37 can be mounted on or inside of or be an integral part of the masted elevator 20 as shown in FIG. 19. Thus, rails 37 can be "C" shaped or I-beam-shaped structures or other flanged beams as seen in transverse cross section. A slot 38 in each of the rails 37 or flange, in case of an I-beam, is provided for enabling travel longitudinally of axles 39 that carry rollers or load wheels 36 (see FIGS. 15, 15A, 19 and 19A).

Figure 15A:
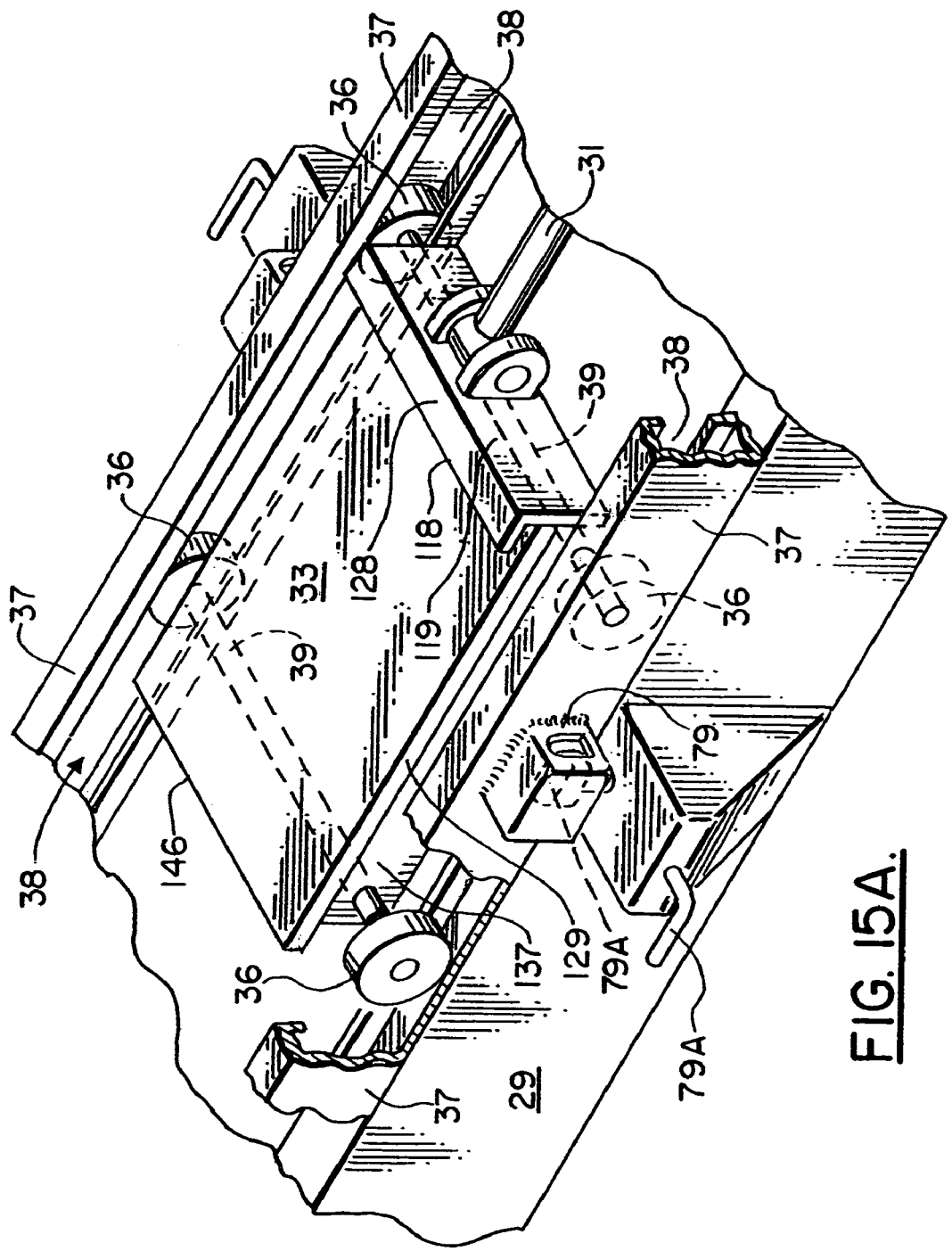
FIG. 15A is a partial perspective view of a carriage assembly connecting to a tank container vessel as seen in FIGS. 22B and 22C of the apparatus of the present invention.

Connecting plate 33 is added (bolted or welded) to lifting carriage assembly 137 as shown in FIGS. 15A and 19. Different sized connecting plates 33 can be provided to accommodate vessels with different size/configurations of connection mechanisms. FIG. 19 shows connecting plate 33 added to lifting carriage assembly 137. This added large, rectangular section, with projecting rectangular end portion 44 and trapezoidal section 40 having diagonally extending surfaces 41 allows for the lifting carriage assembly 137 to utilize a different but similar interlocking and lifting arrangement for the box container 27 and frame tank container 120. The projecting rectangular end portion 44 is sized and shaped to engage socket 43 of receptacle 42. The receptacle 42 provides a pair of diagonally extending surfaces 46 that mate with and transfer the vessel load to the diagonally extending surfaces 41 of connecting plate 33 when the vessel is lifted from its horizontal position, thus allowing for an interlocking arrangement as best shown in FIG. 19A.

The hydraulic ram 31 located within the elevator 20 is designed to facilitate two functions. Initially, ram 31 will move the selected vessel 26, 27, 120 forwards or backwards while in a generally horizontal position, allowing the vessel load to be properly positioned on the chassis 16 while in a transport mode. Additionally, ram(s) 31 function to raise and lower the vessel container on or off the ground when the elevator 20 is in the vertical position as shown e.g. in FIGS. 16, 19A, and 25. This adjustability of the position of the vessel 26, 27, 120 enables vessels of different lengths to be accommodated. If a longer vessel (for example, 35 feet) is in place in a horizontal position upon chassis 16, the hydraulic ram(s) 31 will not need to travel as long a distance as if a shorter vessel (for example 20 feet) were in place.

When mast 20 is to lift vessel 26, the lifting carriage assembly 137 engages a pair of vertically spaced apart beams (Front and rear interlocking plates 140, 141) that are attached (e.g. welded) to tank 26 at saddles 57 (see FIGS. 5–7, 15A, and 22A–22C). Saddles 57 can be used for forming an interface between beams 140, 141 and a cylindrically shaped vessel such as 26 as shown in FIGS. 7, 20, 22, 24.

Each beam 140, 141 can be an angle beam, with an ell shaped transverse cross section as seen in the side view of FIG. 22B. A gap is provided in between each beam 140, 141 and vessel 26 as shown in FIGS. 7, 22B and 22C. These gaps accept parts of the lifting carriage assembly 137 when connecting plate 33 has been removed (e.g. unbolted).

In FIGS. 5–7, 15A and 22A–22C, female interlocking plate 128 connects to male interlocking plate 141 when plate 128 registers in receiver space 145. Simultaneously, male interlocking section 146 of lifting carriage assembly 137 main plate 129 connects to female interlocking plate 140 when male interlocking plate 146 registers in receiver space 144 (see FIGS. 22B and 22C).

Figure 8:
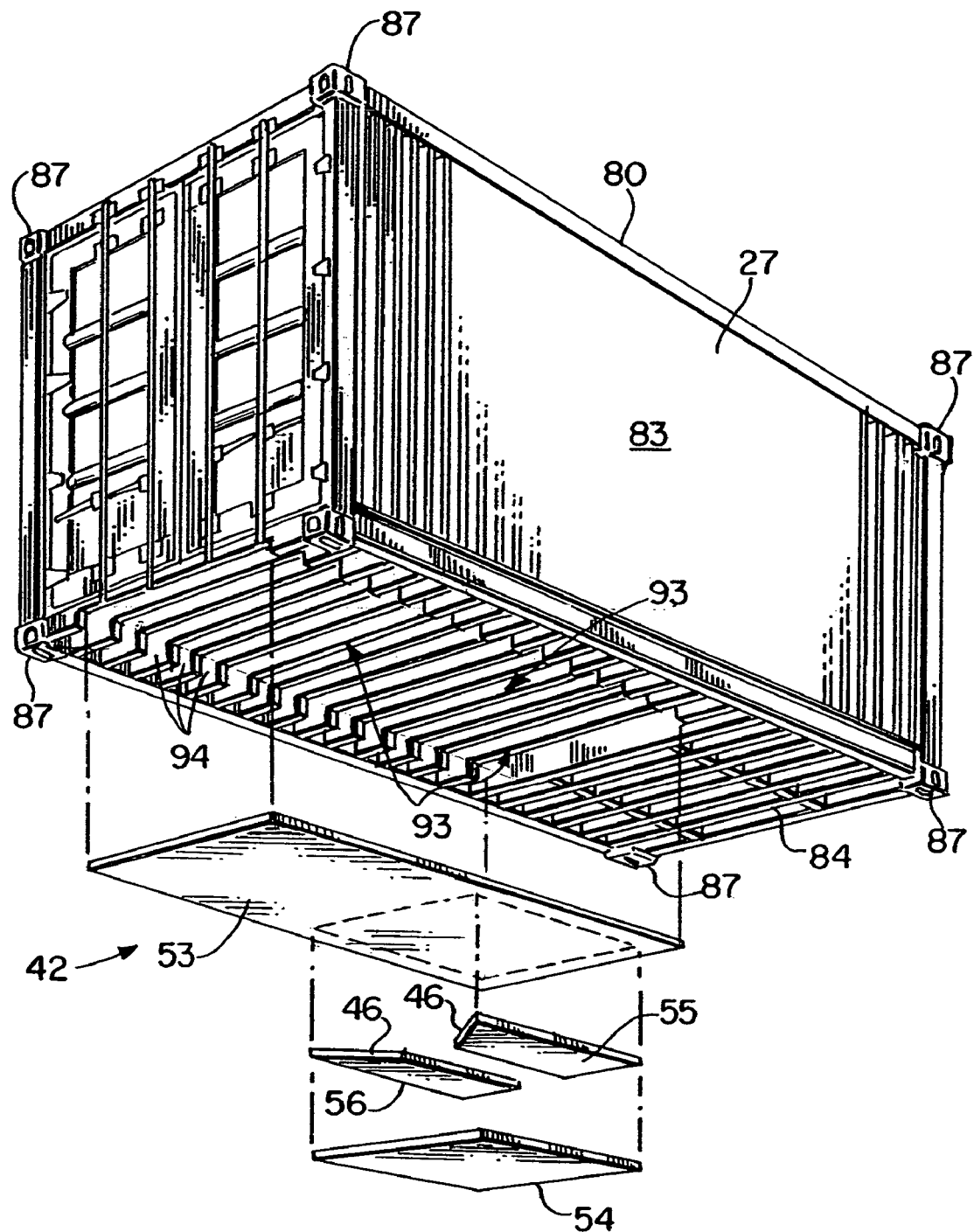
FIG. 8 is a partial perspective view of a preferred embodiment of the apparatus of the present invention illustrating attachment of a receptacle to the box container and interlocking with a male connector shown in FIG. 19.

As depicted in FIGS. 8 and 19, for vessels 26, 27, and 120, receptacle 42 can be in the form of an inner sleeve plate 53 that is attached by welding or other means to a vessel 26, 27, 120 to which other plates 54, 55, 56 are welded or otherwise connected. Sandwiched in between inner sleeve plate 53 and an outer sleeve plate 54 are a pair of spaced apart side sleeve plates 55, 56. The side sleeve plates 55, 56 carry the diagonally extending load transfer surfaces 46 that engage and abut diagonally extending surfaces 41 of trapezoidal section 40 of connecting plate 33.

The present invention provides a method and apparatus that can utilizes a number of different, specially configured containers (vessels) with corresponding attachment mechanisms as described in the text above. In FIG. 1, the present invention shows a method for converting a standard tank container 60 into vessel 26. Tank container 60 includes a cylindrically shaped tank 61 having a pair of opposed dished ends 62 and a cylindrically shaped barrel section 65 having cylindrical side wall 63. Cylindrically shaped side wall 63 is preferably reinforced with a plurality of stiffening rings 64.

As part of the method of the present invention, the standard tank container 60 is converted to a vessel 26 by removing frame 70. The frame 70 typically includes a plurality of beams that form a box-like structure around the tank 61, including longitudinal beams 71, transverse beams 72, and diagonal struts 73. In the preferred embodiment, one or more of these longitudinal or transverse beams 71, 72 that are removed can be used as legs 74 when configuring vessel 26 that is shown in FIGS. 5–7.

Figure 2:
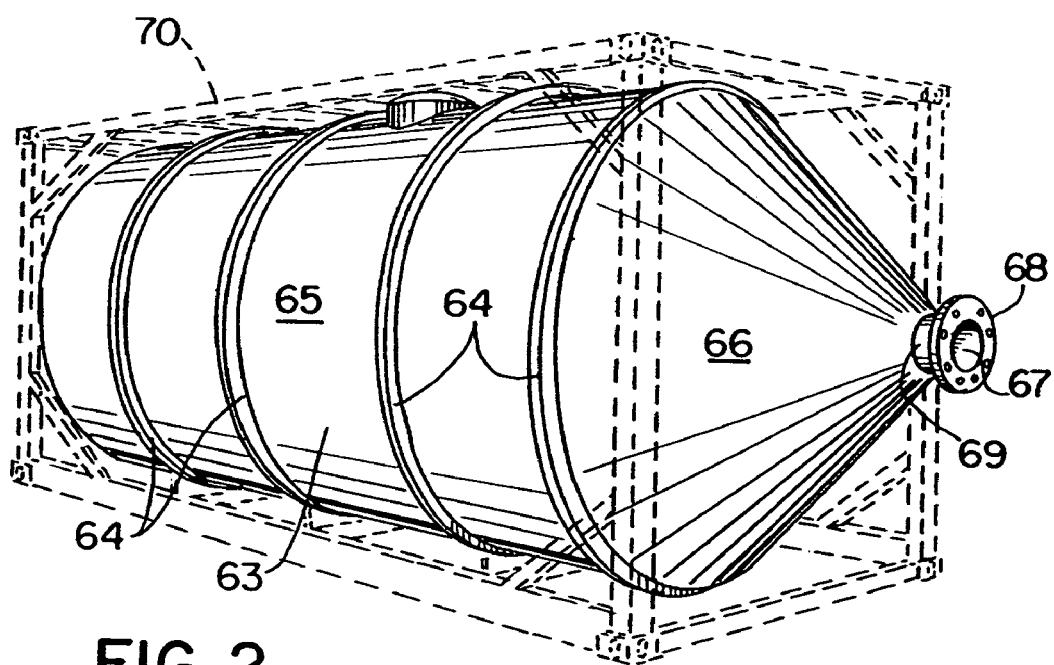
FIG. 2 is a perspective view of the tank container of FIG. 1 showing the frame removed, and cone bottom added, as part of the method of the present invention.

As part of the method of the present invention, one of the dished ends 62 is removed and replaced with cone 66, as shown in FIG. 2. Cone 66 is joined to cylindrical side wall 63, preferably by welding. A stiffening ring 64 is connected (e.g. welded) to the interface that attaches cone 66 to side wall 63 providing extra reinforcement at the connection that joins cone 66 to side wall 63. The cone 66 is fitted with an outlet fitting 69 that includes annular flange 68. Cone opening 67 thus defines an outlet opening for dispensing contents of the vessel 26 during use. A control valve can be bolted to flange 68. A flowline can be fitted to the control valve that is bolted to flange 68 so that a closed system is provided when emptying. FIG. 2 schematically illustrates the removal of frame 70 from a standard tank container 60 as part of the method of the present invention, by showing the frame 70 in phantom lines.

In FIG. 5, the newly constructed or re-configured tank container vessel 26 has been fitted with saddles 57 attached to each side of the stiffening rings 64. On the outside forward and rear are attached front and rear interlocking plates 140 and 141 which accept and lock into their counterparts 146 and 128 located at the front and back of lifting carriage assembly 137. A plurality of legs 74 enable the vessel 26 to be vertically oriented for dispensing material therefrom. In FIG. 5, the combination of the tank 61 that was part of a standard tank container when fitted with cone 66, legs 74, cross bracing 75, feet 76, and receptacle 42 define the new vessel 26. The legs 74 can be attached to the cone section 66 of vessel 26 using welding and connecting plates 77. The legs 74 can be vertical or inclined in orientation. The vessel 26 can be fitted with flow line 58 having valve 59. Flow line 58 and valve 59 can be used to inject air or other gas into vessel 26 interior to help during emptying of the contents of vessel 26 via outlet flange 68. Flowline 58 could also be used to vacuum the contents from vessel 26.

Figure 3:
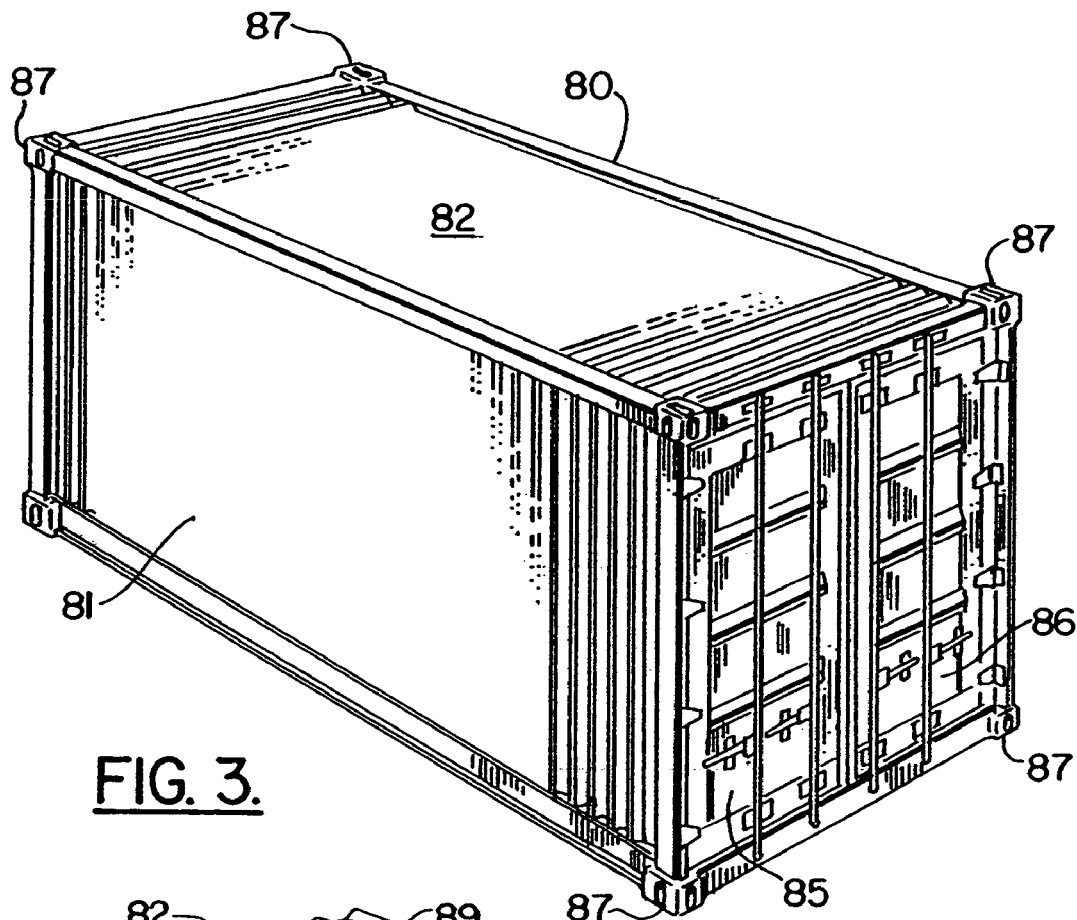
FIG. 3 shows a standard box container in its normal configuration and prior to its conversion to a container that can be used with the method of the present invention.
Figure 4:
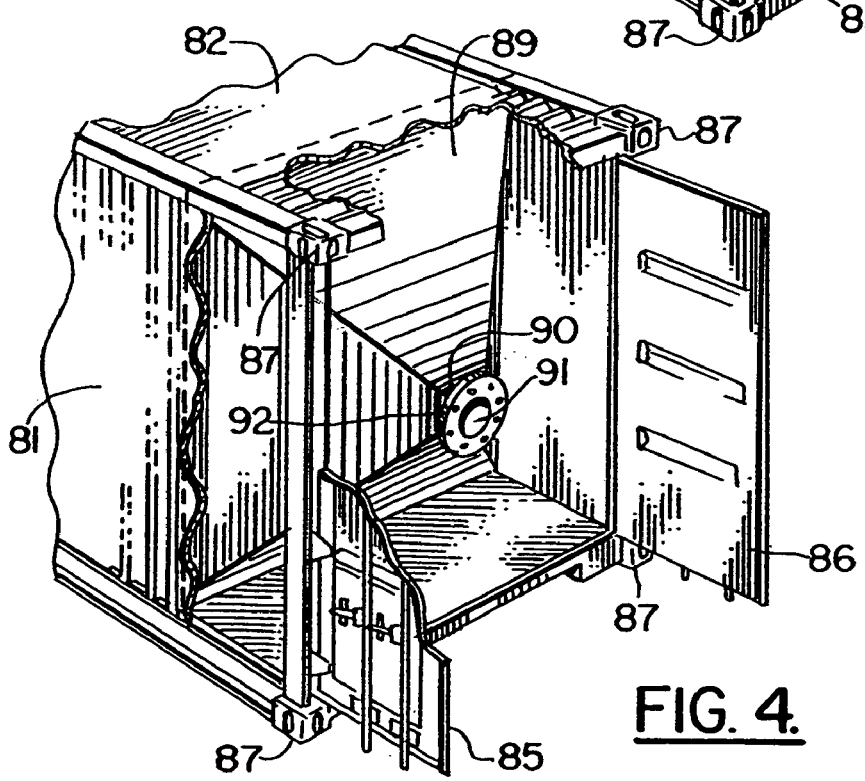
FIG. 4 is a partial perspective view showing the standard box container of FIG. 3 with doors opened, exposing an internal funnel cone added as part of the method of the present invention.

FIGS. 3 and 4 show another type of container that can be used with the method and apparatus of the present invention, converted to vessel 27 depicted in FIG. 16. The container shown in FIGS. 3 and 4 is initially a standard box container 80 having side walls 81, 82, 83, 84 and corner castings 87. Doors 85, 86 can be opened to reveal a cone 89 fitted to the box 80 interior next to the doors 85, 86. This interior funnel and cone 89 is used for dispensing bulk material while in a vertical position that is contained within the box container 80, similar to the tank container shown in FIG. 5. The cone 89 structure provides an outlet fitting 90 having an opening 91 for dispensing material. The outlet fitting 90 preferably includes an annular flange 92 that has openings for enabling a valve to be bolted to the flange 92. An end wall 88, depicted in FIGS. 13 and 18, defines an upper end portion of the container 80 during use, being generally opposite cone section 89.

Figure 9:
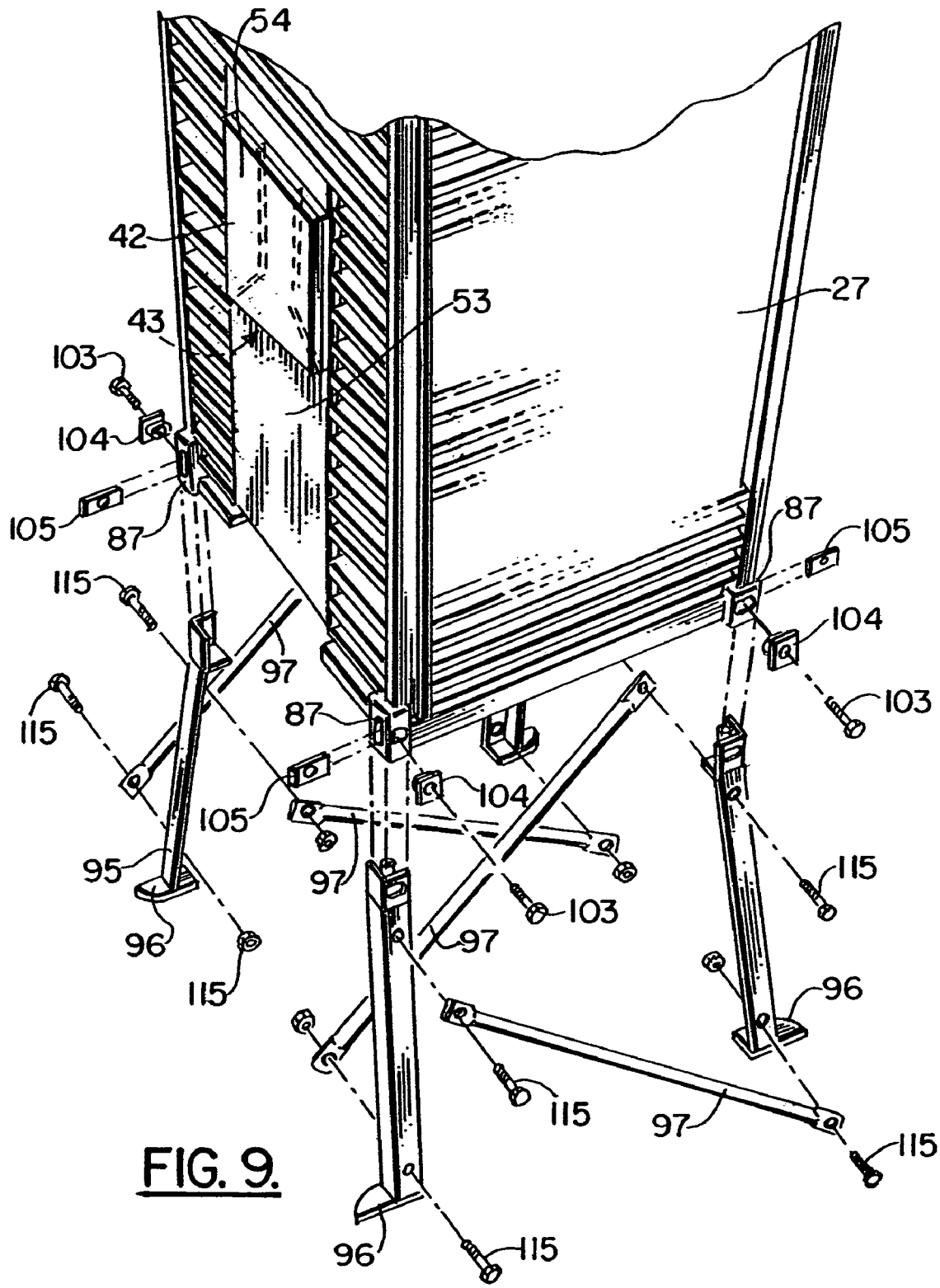
FIG. 9 is a partial perspective view of a preferred embodiment of the apparatus of the present invention illustrating a box container placed in an upright position with detachable leg assembly.

In FIGS. 4 and 8, a container 80 is shown with the construction detail for fitting receptacle 42 thereto, as part of the conversion of container 80 into vessel 27 in accordance with the present invention. The complete vessel 27 includes the reconfigured, or newly constructed, container 80, cone 89, receptacle 42, and legs 95 with feet 96 as shown in FIG. 9.

In FIG. 8, the side walls 81, 82, 83, 84 each have corrugations 94 or transverse beams for reinforcing each of the walls 81, 82, 83, 84. Such transverse corrugations or beams 94 are known in the art and are typically provided on standard box containers before any type of conversion using the method of the present invention.

A recess 93 is provided for receiving inner sleeve plate 53 which can be attached to side wall 84 by welding, or other means for example. Side sleeve plates 55 and 56 are then welded, or bolted, to plate 53 for forming receptacle 42.

Outer sleeve plate 54 is then welded, or bolted, to the combination of plates 53, 55 and 56 to complete the receptacle 42.

A completed view of the receptacle 42 on the vessel 27 is shown in FIG. 9. Vessel 27 is thus comprised of the container 80, cone 89, receptacle 42, legs 95 with feet 96 and cross bracing 97. Additionally, vessel 27 includes a connection 100 shown in FIGS. 10–12 that joins the legs 95 to the corner castings 87. In attaching the legs 95 to container 80 using connections 100, cross bracing 97 is provided for rigidifying the legs 95 laterally.

Figure 10:
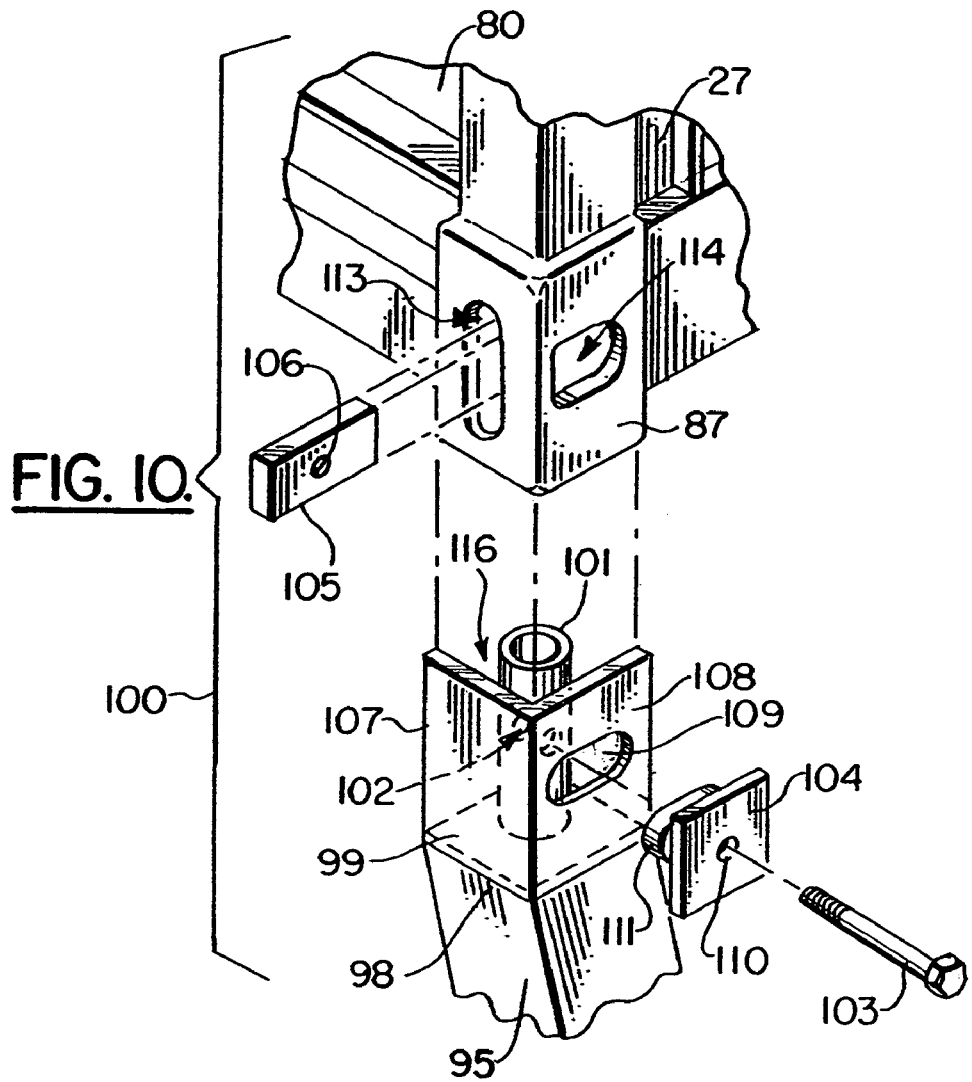
FIGS. 10–12 are partial perspective views of the vessel and leg arrangement shown in FIG. 9, illustrating the details of construction of the legs and their attachment to the box container.
Figure 11:
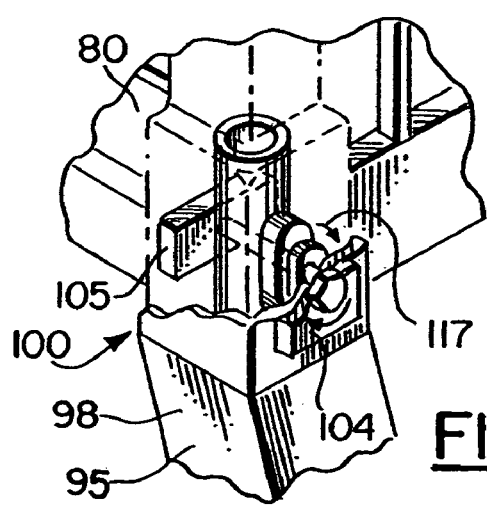
Figure 12:
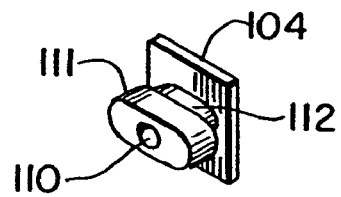

In FIGS. 10–12, each leg 95 provides a leg upper end portion 98 having a plate 99. The plate 99 has a sleeve 101 that can be cylindrically shaped, square shaped or any other shape. Sleeve 101 has a transverse sleeve opening 102 that receives a locking bolt 103 in order to complete a connection 100. The various other components of the connection include a locking spacer 104, a spacer plate 105, and flanges 107, 108 provided at the upper end portion 98 of leg 95 as shown in FIG. 10.

In order to complete the connection 100, a corner casting 87 of container 80 is placed into the receptacle space 116 defined by flanges 107, 108 and plate 99 (see FIGS. 10–11). Locking spacer 104 as shown in FIG. 12 provides an enlarged oblong head 111 and a small oblong portion 112. An opening 110 extends through the locking spacer 104 that is receptive of bolt 103. A pair of slotted openings 113, 114 are provided in corner casting 87.

The corner castings 87 are preferably of the same size and shape, preferably identically configured. The opening 114 aligns with opening 109 of flange 108 when corner casting 87 is inserted into the receptacle space 116. Before inserting the corner casting 87 into the receptacle space 116, spacer plate 105 is inserted through slot 113 as shown in FIG. 10. Once the corner casting 87 occupies receptacle space 116, the enlarged oblong head 111 of locking spacer 104 is inserted into the now aligned openings 109, 114. The locking spacer 104 is then rotated 90 degrees as shown in FIG. 11, indicated schematically by the arrow 117. The enlarged oblong head 111 and small oblong portion 112 are sized and shaped so that the enlarged oblong head 111 extends beyond both flange 108 and through opening 114 of corner casting 87. The corner casting 87 and flange 108 are locked together when the locking spacer 104 is rotated to the position shown in FIG. 11. At this time, the connection 100 is completed by placing bolt 103 through openings 110, 102, and into the internally threaded opening 106 of spacer plate 105. Bolt 103 is rotated and tightened, engaging its threads with the threads of opening 106, thereby holding all of the components 104, 95, 87, 101, and 105 together. To complete the structural stability of vessel 27, cross bracing 97 is bolted to legs 95 as shown in FIGS. 9 and 17–18.

The connection 100 that is shown and described with respect to FIGS. 9–12 can also be used for connecting legs to a specially configured tank 121 as shown in FIGS. 21–27. Vessel 120 in FIGS. 21–24 can be a standard tank container 60 as shown in FIG. 1, with one of its dished ends 122 removed as indicated by phantom lines 62 in FIG. 21. In FIGS. 21–24, the frame 130 of the standard tank container 60 is retained. However, the removed dished end 122 is replaced with a cone section, as was the case with respect to the vessel 26 shown and described in FIGS. 2 and 5–7.

In FIGS. 21–27, vessel 120 includes a tank 121 having a dished end 122 and a cylindrical side wall 123. Opposite dished end 122 there is provided cone 124. Cone 124 can be added to the tank 61 of a standard tank container 60 as shown in FIG. 1, after removal of a dished end 122, the cone 124 being welded to side wall 123. Cone 124 provides an outlet opening 125, an outlet fitting 126, and an annular flange 127. A valving member can be bolted to the annular flange 127 for controlling the flow of bulk material from tank 121 during use. In the embodiment of FIGS. 21–27, the tank 121 is protected by frame 130. The frame 130 can be comprised of longitudinal members 134, lateral members 135, and diagonally extending members 136. Legs 131 having feet 132 are removably attachable to frame 130 at corner castings 87. Thus a connection 100 is made between each leg 131 and a corner casting 87, such connection 100 being shown and described in FIGS. 10, 11 and 12. Legs 131 can be reinforced through the use of cross bracing 133.

FIGS. 29, 30, and 31 show an another alternative embodiment for vessel 26. FIG. 29 is a side view of an alternative vessel 26 wherein the vessel has upper counterbalance wheels 139A pointing upward towards the top of vessel 26. As shown in FIG. 29 vessel 26 can include counter balance wheels 139 and 139A. Vessel 26 can also include saddles 57 and 57A. Attached to saddle 57 can be front female interlocking plate 140. Plate 140 can be placed between counter balance wheels 139A and can include a plurality of reinforcing ribs (not shown) to increase structural strength of plate 140. Counter balance wheels 139A can face upwards when vessel 26 is standing upright. Attached to saddle 57A can be rear male interlocking plate 141. Legs 74, cross bracing 75, and feet 76 can be used as the support structure for vessel 26. Corner castings 150 can be placed adjacent legs 74 and counter balance wheels 139.

FIG. 30 is a bottom view of vessel 26 shown in FIG. 29 and taken from lines 30—30. Cone 66 and cone opening 67 are shown. Also shown are legs 74, cross bracing 75, and feet 76. A bottom view of saddle 57A is shown along with counterbalance wheels 139 and male interlocking plate 141.

FIG. 31 is a side view of vessel 26 shown in FIG. 29 from lines 31—31. Shown is a side view of saddles 57 and 57A. Also shown is a side view of plates 140 and 141 attached respectively to saddles 57 and 57A. A side view of a single counter balance wheel 139A is also shown. Wheel 139 can be attached to saddle 57. As shown in FIG. 31 plate 140 can extend farther from the surface of vessel 26 when compared to plate 141. To increase the strength of plate 141 a plurality of structural ribs can be added (not shown) in order to minimize deflection of plate 141 when it interacts with lifting carriage assembly 137.

FIG. 32 is a side view of vessel 26 shown in FIG. 29 wherein vessel 26 is supported in a horizontal position by chassis 16 of trailer 11. Front female interlocking plate 140 receives front male interlocking section 146. Female interlocking plate 128 receives rear male interlocking plate 141. Lifting carriage assembly 137 rides in the interior of rails 37. Rail 37 can be locked on to trailer 11 and carriage 16 through corner castings 79 and twist locks 79A. A second set of corner castings 79 and twist locks 79A (making a total of four) would be found on the opposite side of trailer 11 in FIG. 32.

As will be described in more detail below, vessel 26 can be locked onto trailer 11 by the combined interaction between counterbalance wheels 139A in receptacles 160; front female interlocking plate receiving front male interlocking section 146; female interlocking plate 128 receiving rear male interlocking section 146; and corner castings being locked in twist locks 170.

FIG. 33 is a sectional view of vessel 26 and trailer 11 shown in FIG. 32 and taken along the lines 33—33. FIG. 34 is a sectional view taken along the lines 34—34. As shown in the sectional views of FIGS. 34 and 35, counter balance wheels 139A can ride on top of rail 37. A second counter balance wheel 139A and rail 37 would be found on the opposite side of trailer 11 in FIG. 32. As shown in FIG. 33, counter balance wheels 139 also can ride on top of rails 37.

Counter balance wheels 139 and 139A along with lifting carriage assembly 137 allow vessel 26 to roll on rails 37 of trailer 11. FIG. 35 is a fragmentary side view of vessel 26 and trailer 11 shown in FIG. 32 and illustrating an upper counterbalance wheel 139A entering receptacle 160. As shown in FIG. 35 counter balance wheel 139A can be moved in the direction of arrow 162 and received by receptacle 160. In FIGS. 32 and 34 counterbalance wheel 139A is shown as being located inside of receptacle 160. As shown in FIG. 35 receptacle 160 can include bracing 161.

In FIG. 32 vessel 26 is locked in place by the interaction of two receptacles 160, counterbalance wheels 139A and two sets of interlocking corner castings 150 and twist locks 170. FIG. 33 provides an example of corner casting 150 interlocking with twist lock 170. Handle 170A can be used to lock and unlock twist lock 170. The second set of items would be seen from the opposite side view as that shown in FIG. 32. The interaction between lifting carriage assembly 137 and plates 140, 141 also helps to lock vessel 26 to trailer 11. Additionally, front female interlocking plate receives front male interlocking section 146 and female interlocking plate 128 receives rear male interlocking section 146. Accordingly, vessel 26 tends to be locked in place on trailer 11 even during transit from one location to another.

In FIG. 32 rail 37 can be locked to chassis 16 using corner castings 79 and twist locks 79A. A second set of corner castings 79 and twist locks 79A would be seen from the opposite side view as that shown in FIG. 32.

FIGS. 36 through 40 show another alternative embodiment for transporting a vessel 26 to a worksite. This embodiment includes a trailer-rail car-trailer application. A rail car 180 can be used to transport vessel 26 from a first terminal 230 to a second terminal 235. From second terminal 235, vessel 26 can be transported by trailer 11 to a specified work location. Vessels 26 and trailers 11 can be as described in earlier embodiments.

Various terminals can be set up in strategic geographic locations to provide broad coverage for transporting an inventory of vessels 26. For example, in a preferred embodiment twenty five terminals can be set up in strategic locations around North America which will allow coverage from these terminals to various work locations. Terminals can each have inventories of vessels 26. Additionally, vessels 26 can be relocated by rail from one terminal to another depending on the requirements of specific terminals. Furthermore, vessels 26 can be moved filled, partially, filled, or empty when being transported by rail. In one embodiment an inventory of vessels 26 are stored at various terminals.

In an alternative rail embodiment a terminal may not have a rail car loading station and trailer 11 can be used to transport vessel 26 from such terminal to a loading station for rail car 180. Rail car 180 can then transport vessel 26 to a second location wherein vessel 26 can be loaded onto a second trailer 11A. Second trailer 11A can either then take vessel 26 to a second terminal or a work location.

Figure 36:
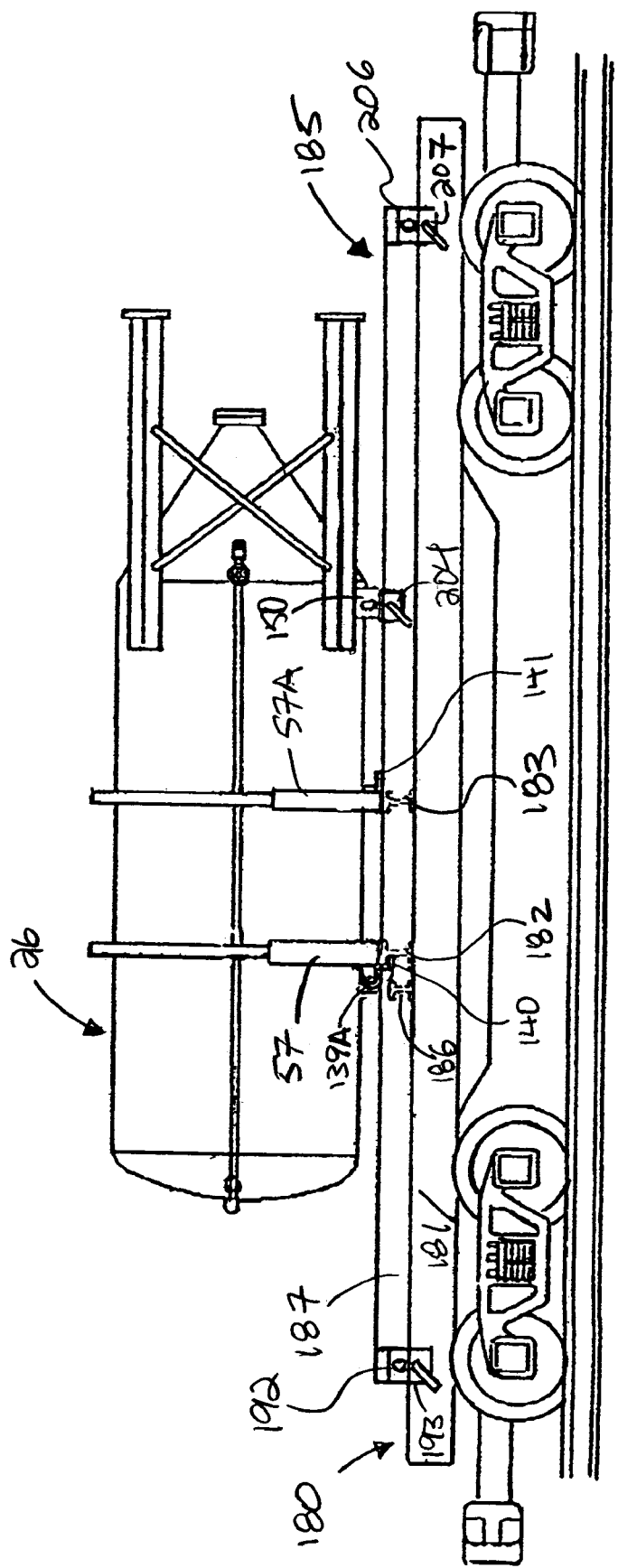
FIG. 36 is shows another alternative embodiment of the present invention wherein a rail car can be used in transporting a vessel.

FIG. 36 is shows another alternative embodiment wherein vessel 26 can be transported using a rail car 180. Vessel 26 is shown mounted in a horizontal position on rail car 180. Vessel 26 can be the same construction as shown in FIG. 29. Rail car 180 can be a conventionally available rail car. Mounted on rail car 180 is rail frame 185. Vessel 26 can be mounted on rail frame 185. Vessel 26, rail frame 185, and rail car 180 would appear substantially similar if the opposite side view was also shown in FIG. 36.

Figure 37:
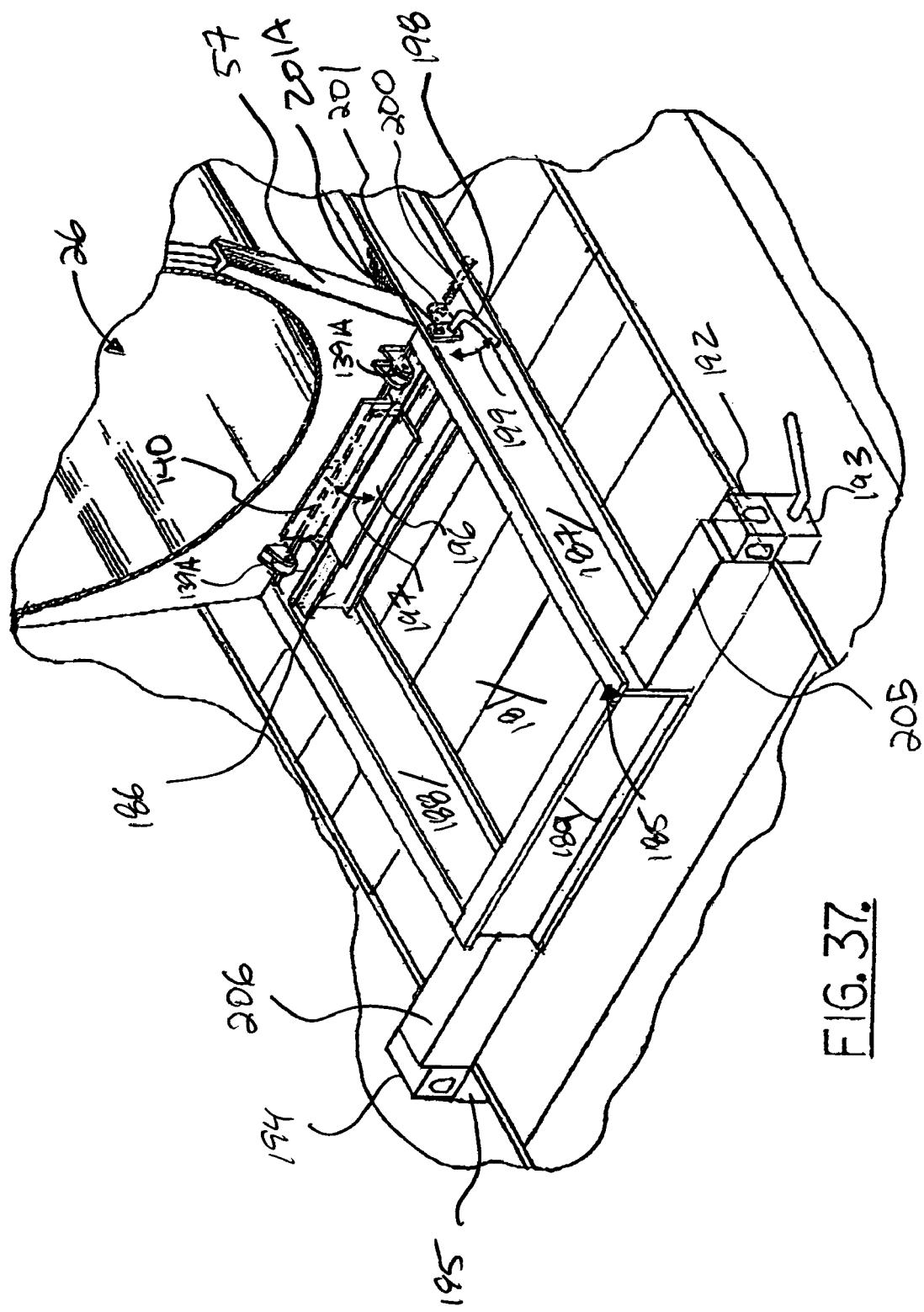
FIG. 37 is a fragmentary front view of the vessel and rail car shown in FIG. 36 and illustrating a locking flip plate.

FIG. 37 is a fragmentary sectional front view of the vessel 26 and rail car 180 shown in FIG. 36 and illustrating rail frame 185 and locking flip plate 197. Rail frame 185 sits on bed 181 of rail car 180 and can be secured by a series of interlocking corner castings and twist locks. As shown in FIGS. 36 and 37, rail frame 185 can include corner castings 192, 194, 206, and 208 (although corner casting 208 is not shown). Corner castings 192, 194, 206, and 208 can attach rail frame 185 to rail car 180 by interconnection with respective twist locks 193, 195, 207, and 209. Twist locks 193, 195, 207, and 209 can be twist locks which are typically found on conventional rail cars. Rail frame 185 can be designed to adapt conventional rail car 180 to carry vessel 26. Rail frame 185 can be comprised of beams 187, 188, 189, and 190, which can be of an I-beam construction. Beams 187–190 can form a rectangle to support vessel 26. Cross braces 182 and 183 can be used to stiffen rail frame 185. Additionally, cross brace 182 can be positioned to align with saddle 57 and cross brace 183 can be positioned to align with saddle 57A. Cross brace 182 can preferably be an I-beam having top flange 182A. Rail frame 185 can also include twist lock 180 which aligns with corner casting 150 of vessel 26. Additional cross bracing can be included such as under corner casting 150.

Rail frame 185 can also include locking plate 196 to secure vessel 26 by contact with front female interlocking plate 140. Spacing beams 205 and 206 can be used to connect corner castings 192 and 194 to rail frame 185. An addition set of spacing beams can be used to connect corner castings 206 and 208 to rail frame 185.

In FIG. 37 beams 187 and 188 are shown spaced about equal to the width of saddle 57. However, beams 187 and 188 can also be spaced such that they align with counter balance wheels 139A and 139. If aligned with the counter balance wheels, vessel 26 can be rolled on rail frame 185 facilitating the positioning of vessel 26 for securing to the rail frame. Alternatively, a second set of beams can be placed under counter balance wheels 139A and 139 to allow vessel 26 to roll in a horizontal direction. As shown in FIG. 37, there will be no rolling and vessel 26 frictional forces must be overcome to slide vessel 26 into position for being secured on rail frame 185. FIGS. 38 and 39 show a process of securing vessel 26 on rail frame 185.

Once vessel 26 is in position on rail frame 185, locking plate 196 can be used to lock vessel 26 in place. To secure vessel 26, handle 198 can be rotated clockwise causing locking plate to rotate clockwise and contact front female interlocking plate 140. Pin 200 can be placed in hole 201A to lock handle in position. When not in locking use pin 200 can be placed in hole 200. To unsecure pin 200 can be pulled out of hole 201A and handle 199 rotated in a counterclockwise direction causing locking plate 196 to also move in a counterclockwise direction. Arrows 199 and 197 schematically indicate the movement of handle 199 and locking plate 196 between locking and unlocking positions.

FIG. 38 is a sectional view illustrating the process of front female interlocking plate 140 being connected to rail frame 185 via cross brace 182. Cross brace 182 can be an I-beam having top member 182A. Vessel 26 can be lowered in the direction of arrow 203 such that front female interlocking plate 140 is lowered to a position below top member 182A. Vessel 26 is then moved in the direction of arrow 202 (FIG. 39) so that interlocking plate 140 engages top member 182A of cross brace 182. In the engaging position saddle 57 rests on top of top member 182A. Locking beam 186 is preferably of a height that it does not interfere with interlocking plate 140 when plate 140 is being engaged with top member 182A.

FIG. 39 is a section view illustrating locking plate 196 interlocking front female interlocking plate 140 to the cross brace 182. Locking plate 196 is shown in the locked position. Arrow 197 schematically illustrates the change of locking plate from the locked position to the unlocked position. Locking plate 196 is shown in broken lines in the unlocked position. If desired an additional sister locking plate and can be placed relative to saddle 57A and/or rear male interlocking plate 141.

Figure 40:
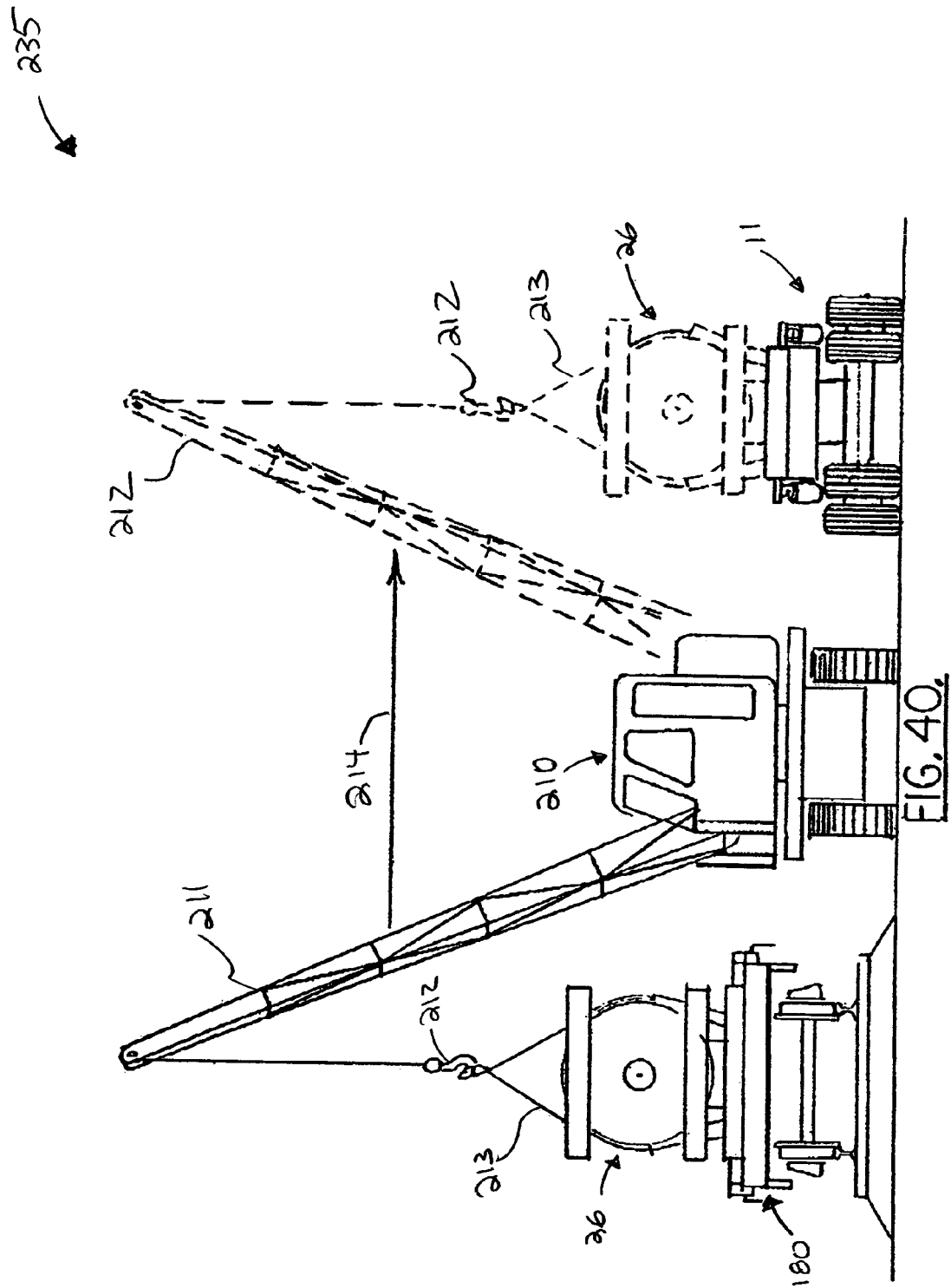
FIG. 40 is a schematic showing a crane transferring a vessel such as that shown in FIG. 29 to a trailer such as that shown in FIG. 32.

FIG. 40 schematically illustrates crane 210 transferring vessel 26 from rail car 180 to trailer 11. Trailer 11 can be of the type shown in FIG. 32. Rail car 180 can be of the type shown in FIG. 36. Crane 210 is comprised of boom 211 and hook 212. Strap system 213 can be used to lift vessel 26 from rail car 180. Before lifting vessel 26 from rail car 180, vessel 26 should be unsecured. Locking plate 196 should be placed in an unlocked position. All twist locks between rail frame 185 and vessel 26 should be unlocked. Additionally, vessel 26 should be first moved in the direction opposite of arrow 202 (FIG. 39) to disengage front female interlocking plate 140 from top member 182A. Otherwise damage to vessel 26, interlocking plate member, and/or cross brace 182 can occur. Furthermore, although a crane 210 is shown, it is anticipated that any type of lifting device can be used to transfer vessel 26 to and from rail car 180, assuming that the lifting device can support the weight of vessel 26.

An alternative summary of the operation of the trailer—rail—trailer embodiment follows. Vessel 26 arrives at terminal 230 via trailer 11. Twist locks 170 are unlocked and straps 213 connected to crane 210 are placed around vessel 26. Crane 210 picks up vessel 26. Rail frame 185 is secured to vessel 26 using twist locks 204 and corner castings 150 along with front female interlocking plate member 140, cross brace 182 and locking plate 196. Vessel 26 and rail frame 185 is secured to rail car 180 via corner castings 192, 194, 206, and 208 attached respectively to twist locks 193, 195, 207, and 209. Rail car 180 transports vessel 26 to second terminal 235. To unload vessel 26 substantially the reverse procedure is performed as stated above, however, vessel 26 will be loaded onto second trailer 11A located at second terminal 235.

PARTS LIST

The following is a list of suitable parts and materials for the various elements of the preferred embodiment of the present invention.

Part No. Description
10 bulk container transport apparatus
11 trailer
12 front end portion of trailer 11
13 rear end portion of trailer 11
14 trailer tongue
15 wheel
16 chassis of trailer 11
16A curved tail section of chassis 16
17 outrigger
18 pivotal connection
19 foot of outrigger 17
20 masted elevator
20A curved tail section of elevator 20
21 pivotal connection
22 hydraulic ram
23 pivotal connection
24 pivotal connection
24A bolster
25 arrow
25A arrow
26 vessel
27 box style vessel
28 elevator frame
29 longitudinal beam
30 transverse beam
31 hydraulic ram
32 pivotal connection
33 connecting plate (additional)
34 pivotal connection
35 arrow
36 load wheel supporting connecting plate
37 rail
38 slot in rail 37
39 axle carrying load wheel 36
40 trapezoidal section of connecting plate
41 diagonally extending surface
42 receptacle
43 socket of receptacle 42
44 projecting rectangular end portion of connecting plate 33
45 large rectangular section of connecting plate 33
46 diagonally extending surfaces of receptacle 42
48 back surface of chassis 16
49 center of gravity of vertically positioned vessel
50 extended position of outrigger 17
51 dolly leg
52 sand shoe
53 inner sleeve plate
54 outer sleeve plate
55 side sleeve plate
56 side sleeve plate
57 saddle
58 flowline
59 valve
60 standard tank container
61 tank
62 dished end of tank 61
63 cylindrical side wall of tank 61
64 stiffening ring
65 barrel section of tank 61
66 cone
67 cone opening
68 annular flange
69 outlet fitting of cone 66
70 frame
71 longitudinal beam of frame 70
72 transverse beam of frame 70
73 diagonal strut of fame 70
74 leg of vessel 26
75 cross bracing of vessel 26
76 feet of vessel 26
77 connecting plate
78 jack
79 corner casting
79A twist lock
80 box container
81 side wall of box container 80
82 side wall of box container 80
83 side wall of box container 80
84 side wall of box container 80
85 door
86 door
87 corner casting of box container 80
88 end wall of box container 80

89 cone
90 outlet fitting
91 cone opening
92 annular flange
93 recess
94 corrugations
95 leg
96 foot
97 cross bracing
98 leg upper end
99 plate
100 connection
101 sleeve
102 sleeve opening
103 bolt
104 locking spacer
105 spacer plate
106 internally threaded opening
107 flange
108 flange
109 flange opening
110 opening through locking spacer 104
111 enlarged oblong head of locking spacer 104
112 small oblong portion of locking spacer 104
113 slot in corner casting 87
114 slot in corner casting 87
115 bolted connection
116 receptacle space
117 arrow
118 lifting beam
119 flange
120 vessel
121 tank
122 dished end of tank 121
123 cylindrical side wall of tank 121
124 cone
125 cone outlet opening
126 outlet fitting
127 annular flange
128 female interlocking plate
129 main plate
130 frame
131 leg
132 foot
133 cross bracing
134 longitudinal member of frame 130
135 lateral member
136 diagonal member
137 lifting carriage assembly
139 counter balance wheels
139A counter balance wheels
140 front female interlocking plate
141 rear male interlocking plate
144 receiver space for front male interlocking section
145 receiver space for female interlocking plate
146 front male interlocking section of main plate
150 corner casting
160 receptacle
161 bracing for receptacle
162 arrow
170 twist lock
170A handle for twist lock
180 rail car
181 bed of rail car
182 cross brace
183 cross brace
185 rail frame
186 locking beam
187 beam
188 beam
189 beam
190 beam
192 corner casting
193 twist lock
194 corner casting
195 twist lock
196 locking plate
197 arrow
198 handle
199 arrow
200 pin
201 hole
201A hole
202 arrow
203 arrow
204 twist lock
206 corner casting
207 twist lock
208 corner casting
209 twist lock
210 crane
211 boom for crane
212 hook
213 strap
214 arrow
230 terminal
235 terminal The foregoing embodiments are presented by way of example only; the scope of the present invention is to be limited only by the following claims.

The invention claimed is:

1. A method of supplying bulk material to an end user comprising the steps of:
   a) providing a bulk material source that is at a location distant from the end user;
   b) providing a vessel the vessel having a top and a base, and a trailer and chassis for transporting the vessel, the chassis having top, bottom, front, and rear portions;
   c) transporting the vessel to the bulk material source;
   d) at least partially filling the vessel with the bulk material at the bulk material source;
   e) transporting the vessel that was filled in step "d" to the end user while remaining at least partially filled;
   f) wherein the vessel is in a generally horizontal, reclined position in step "e";
   g) unloading the vessel from the trailer after steps "e" and "f", including moving the vessel from the generally horizontal position to a generally upright and elevated position, wherein when in the generally upright and elevated position the base of the vessel is located above the top of the chassis; and
   h) lowering the vessel from the elevated position to a final, installed position.

2. The method of claim 1 wherein in step "b" the trailer is provided with a lifting device and the lifting device performs the dual function of adjusting the position of the vessel on the trailer and elevating or lowering the vessel.

3. The method of claim 2 wherein the lifting device is a hydraulic ram.

4. The method of claim 2, wherein the lifting device comprises a pair of hydraulic rams that connect to the chassis at spaced apart positions.

5. The method of claim 1 wherein in step "b" the trailer is provided with a lifting device and the lifting device includes a hydraulic ram and the hydraulic rain is a dual function ram that both adjusts the position of the vessel in steps "e" and "f" when it is reclined on the trailer and changes elevation of the vessel when the vessel is lowered in step "h".

6. The method of claim 1 wherein in step "b" the trailer is provided with a lifting device and in step "h" the lifting device moves vertically while the chassis remains substantially at a single elevation.

7. The method of claim 1 wherein step "g" includes moving the vessel with one or more hydraulic rams.

8. The method of claim 7 wherein there are a plurality of hydraulic rams on the trailer, at least one rain being positioned to move the vessel longitudinally on the trailer when the vessel is in the generally horizontal position on the trailer, and further comprising the step of moving the vessel longitudinally on the trailer between steps "f" and "g".

9. The method of claim 7 wherein a hydraulic ram slides the vessel in step "g".

10. The method of claim 1 further comprising the step of moving the vessel longitudinally on the trailer between steps "f" and "g".

11. The method of claim 1 wherein step "b" comprises providing a vessel that has an upper generally cylindrically shaped portion and a conical portion below the cylindrical portion, the cylindrical and conical portions having a common interior for holding bulk material.

12. The method of claim 1, further comprising the step of constructing the vessel of step "b" by removing the outer frame from a tank container that includes a tank vessel surrounded by an outer frame.

13. The method of claim 1 wherein in step "b" the trailer is comprised of a wheeled chassis and a masted elevator movably attached to the chassis, and in steps "b" and "c" the vessel is connected to the elevator and step "g" includes moving the elevator and the vessel together from a generally horizontal to a generally upright position.

14. The method of claim 13 wherein one or more hydraulic rams connect the elevator to the wheeled chassis.

15. The method of claim 13 wherein the elevator is pinned to the chassis at a pinned connection and further comprising the step of pivoting the elevator about the pinned connection in step "g".

16. The method of claim 13 wherein the elevator and vessel have respective connecting portions and further comprising the step of engaging the connecting portions before step "g".

17. The method of eaim 16 wherein the connecting portions enable the elevator to hold the vessel in an elevated position that spaces the vessel above the top of the chassis and further comprising simultaneously lowering the connecting portions and the vessel as part of step "g".

18. The method of claim 17 wherein at least one hydraulic rain on the elevator lowers the connecting portions and vessel as part of step "g".

19. The method of claim 13 wherein the masted elevator has a top and bottom portions, and a curved section between the top and bottom portions, so that when the elevator is in a vertical position, the bottom portion of the masted elevator is located closer to the front portion of the trailer when compared to the location of the top portion of the masted elevator to the front portion of the trailer.

20. The method of claim 1 wherein the vessel provided in step "b" is a curve sided container.

21. The method of claim 1 wherein the vessel is loaded with between 1 and 50,000 pounds of bulk material in step "d".

22. The method of claim 1 wherein the chassis trailer includes a plurality of wheels, and farther comprising the step of adjusting the position of the vessel longitudinally along the trailer chassis relative to the trailer wheels before step "g".

23. The method of claim 1 wherein the trailer has a chassis having front and rear end portions and a plurality of wheels, and including the step of moving the vessel longitudinally on the chassis relative to the wheels before step "c" and again before step "g".

24. The method of claim 23 further comprising supporting the trailer chassis with outriggers at the rear end portion of the trailer.

25. The method of claim 1 wherein in step "g" the vessel is moved behind the trailer.

26. The method of claim 1 wherein multiple vessels are delivered to the end user, and when a full vessel is delivered to the end user an empty vessel is retrieved from the end user.

27. The method of claim 1, wherein in step "b" the vessel comprises a plurality of counterbalance wheels and the trailer comprises a plurality of receptacles, and in step "e" the counterbalance wheels are contained within the receptacles restricting longitudinal movement of the vessel towards the front of the chassis while allowing longitudinal movement towards the rear of the chassis.

28. The method of claim 27, wherein in step "b" the vessel comprises a plurality of corner castings and the trailer comprises a plurality of twist locks, and in step "e" each corner casting is locked in one of the twist locks.

29. The method of claim 27, wherein longitudinal movement of the vessel in one direction causes the counterbalance wheels to be contained within the receptacles and longitudinal movement of the vessel in the opposite direction causes the counterbalance wheels to move outside of the receptacles.

30. A method of supplying bulk material to an end user comprising the steps of:
a) providing a bulk material source that is at a location distant from the end user;
b) providing a vessel having a top and a bottom and a trailer for transporting the vessel, the trailer having a top, bottom, front, and rear portions and at least one wheeled axle;
c) transporting the vessel to the bulk material source;
d) at least partially filling the vessel with the bulk material at the bulk material source;
e) transporting the vessel that was filled in step "d" to the end user and while remaining at least partially filled;
f) wherein the vessel is laying upon the trailer in a reclined position in step "e" and the bottom of the vessel located between the at least one wheeled axle and the front of the trailer;
g) sliding the vessel longitudinally upon the chassis in a direction that moves the vessel toward the rear of the trailer and unloading the trailer by moving the vessel from the generally horizontal position to a generally upright, elevated position; and
h) lowering the vessel from the elevated position of step "g" to a lowered position.

31. The method of claim 30 wherein in step "b" the trailer has a wheeled chassis, a plurality of hydraulic cylinders, and a vessel elevator movably mounted to the trailer, the vessel elevator being movable upon the chassis between lowered and elevated positions with at least one of the hydraulic cylinders.

32. The method of claim 31 wherein at least one hydraulic cylinder on the trailer enables the vessel to be moved along the chassis.

33. The method of claim 30 wherein there are a plurality of hydraulic rams on the trailer, at least one ram being positioned to move the vessel longitudinally on the trailer when the vessel is in the generally horizontal position on the trailer, and further comprising the step of moving the vessel longitudinally on the trailer between steps "f" and "g".

34. The method of claim 33, further comprising the step of constructing the vessel of step "b" by removing the outer frame from a tank container that includes a tank vessel surrounded by an outer frame.

35. The method of claim 30 further comprising the step of moving the vessel longitudinally on the trailer between steps "f" and "g".

36. The method of claim 30 wherein step "b" comprises providing a vessel that has an upper shaped portion and a conical portion below the cylindrical portion, the cylindrical and conical portions having a common interior for holding bulk material.

37. The method of claim 30 wherein a hydraulic ram slides the vessel in step "g".

38. The method of claim 37 wherein in step "b" the trailer is comprised of a wheeled chassis having front, rear, top, and bottom portions, and a masted elevator movably attached to the chassis, and in steps "b" and "c" the vessel is connected to the elevator and step "g" includes moving the elevator and the vessel together from a generally horizontal to a generally upright position.

39. The method of claim 38 wherein a hydraulic ram connects the elevator to the wheeled chassis.

40. The method of claim 38 wherein the elevator is pinned to the chassis at a pinned connection and further comprising the step of pivoting the elevator about the pinned connection in step "g".

41. The method of claim 40 wherein the elevator and vessel have respective connecting portions and further comprising the step of engaging the connecting portions before step "g".

42. The method of claim 41 wherein the connecting portions enable the elevator to hold the vessel in an elevated position wherein the bottom of the vessel is at an elevation above the top of the chassis and further comprising simultaneously lowering the connecting portions and the vessel as part of step "g".

43. The method of claim 42 wherein at least one hydraulic ram on the elevator lowers the connecting portions and vessel as part of step "g".

44. The method of claim 38 wherein the masted elevator has a top and bottom portions, and a curved section between the top and bottom portions, so that when the elevator is in a vertical position, the bottom portion of the masted elevator is located closer to the front portion of the trailer when compared to the location of the bottom portion of the masted elevator to the front portion of the trailer.

45. The method of claim 30 wherein the vessel provided in step "b" is a curve sided container.

46. The method of claim 30 wherein the trailer includes a trailer chassis having at least four wheels and further comprising the step of adjusting the position of the vessel longitudinally along the trailer chassis relative to the wheels before step "g".

47. The method of claim 30 wherein the trailer has a chassis having front and rear end portions and including at least four wheels next to the rear end portion, and including the step of moving the vessel longitudinally on the chassis relative to the wheels before step "c" and again before step "g".

48. The method of claim 30 wherein in step "g" the vessel is moved behind the trailer.

49. The method of claim 1 or 30 wherein the trailer departs from the location of the source of the bulk material, after the vessel is installed in the generally vertical position, enabling the vessel to remain as temporary storage, until the trailer returns.

50. The method of claim 1 or 30 wherein the trailer leaves the filled vessel at the destination and departs from the destination so that the vessel can be unloaded as needed by the end user.

51. The method of claim 30, wherein in step "b" the vessel comprises a plurality of counterbalance wheels and the trailer comprises a plurality of receptacles, and in step "e" the counterbalance wheels are contained within the receptacles restricting longitudinal movement of the vessel towards the front of the chassis while allowing longitudinal movement towards the rear of the chassis.

52. The method of claim 51, wherein longitudinal movement of the vessel in one direction causes the counterbalance wheels to be contained within the receptacles and longitudinal movement of the vessel in the opposite direction causes the counterbalance wheels to move outside of the receptacles.

53. A method of supplying bulk material to an end user comprising the steps of:
 a) providing a bulk material source that is at a location distant from the end user;
 b) providing a vessel that has a top, a bottom and sides and respective spaced apart upper and lower vessel connecting portions, and a trailer having top, bottom, rear, and front portions for transporting the vessel, the trailer including a chassis and an elevator movably attached to the rear of the chassis, the elevator having respective upper and lower elevator connecting portions for slidably interlocking with the vessel's respective upper and lower vessel connecting portions;
 c) transporting the vessel to the bulk material source;
 d) at least partially filling the vessel with the bulk material at the bulk material source;
 e) transporting the vessel that was filled in step "d" to the end user and while remaining at least partially filled;
 f) wherein the vessel is laying on one of its sides in step "e";
 g) transferring the vessel from the trailer to an installed position that slides the vessel toward the rear of the trailer) elevates the vessel to a generally vertical position and then lowers the vessel;
 h) lowering the vessel from the elevated position of step "g" to a lowered position; and
 I) wherein in step "b" the vessel comprises a plurality of counterbalance wheels and the trailer cormprises a plurality of receptacles and in step "e" the counterbalance wheels are contained within the receptacles restricting longitudinal movement of the vessel towards the front of the chassis while allowing longitudinal movement towards the rear of the chassis and wherein longitudinal movement of the vessel in one direction causes the counterbalance wheels to be contained within the receptacles and longitudinal movement of the vessel in the opposite direction causes the counterbalance wheels to move outside of the receptacles.

54. The method of claim 26 wherein in step "b" the masted elevator has a top and bottom portions, and a curved section between the top and bottom portions, so that when the elevator is in a vertical position, the bottom portion of the masted elevator is located closer to the front portion of the trailer when compared to the location of the top portion of the masted elevator to the front portion of the trailer.

55. The method of claim 1, 30, or 53, wherein step "b" comprises providing a vessel that has an upper generally cylindrically shaped portion or a generally box shaped upper portion and a lower conical portion below the upper cylindrical or box shaped portion, the upper portion and lower conical portions having a common interior for holding bulk material, and a trailer for transporting the vessel.

56. The method of claims 1, 30, or 53, further comprising the step of constructing the vessel of step "b" by removing the outer frame from a tank container that includes a tank vessel surrounded by an outer frame or manufacturing a new vessel of any metal (carbon steel, stainless steel, aluminum or other metal alloy), plastic, fiberglass, lined or unlined.

57. The method of claim 1, 30, or 53, where the legs on the vessel are permanently attached to support the vessel free of the trailer during steps "g" and alternatively step "d".

58. The method of claim 1, 30, or 53, where the legs are attached between steps "c" and "d", detached after step "d" and attached before step "g".

59. A method of supplying bulk material to an end user comprising the steps of:
  a) providing a bulk material source that is at a location distant from the end user;
  b) providing a vessel for storing the bulk material, the vessel having counterbalance wheels;
  c) providing a first trailer for transporting the vessel;
  d) providing a rail car for transporting the vessel from a first terminal to a second terminal;
  e) providing a second trailer for transporting the vessel;
  f) filling the vessel with the bulk material at the bulk material source;
  g) using the first trailer, transporting the vessel that was filled in step "f" to the first terminal and loading the vessel on to the rail car;
  h) using the rail car, transporting the vessel from the first terminal to the second terminal with;
  I) loading the vessel onto the second trailer;
  j) using the second trailer having front and rear portions and a plurality of receptacles, transporting the vessel to a work site;
  k) wherein in step "j" the vessel is in a generally horizontal, reclined position, wherein longitudinal movement of the vessel relative to the front portion trailer is restricted by the counterbalance wheels entering the plurality of receptacles;
  l) unloading the vessel from the second trailer after steps "j" and "k", including moving the vessel from the generally horizontal position to a generally upright and elevated position; and
  m) lowering the vessel from the elevated position to a final, installed position.

60. The method of claim 59 wherein in step "e" a lifting device is provided and the lifting device performs the dual function of adjusting the position of the vessel on the second trailer and elevating or lowering the vessel.

61. The method of claim 60 wherein the lifting device is a hydraulic ram.

62. The method of claim 60 wherein the lifting device comprises a pair of hydraulic rams that connect to the masted elevator at spaced apart positions.

63. The method of claim 60 wherein the lifting device includes a hydraulic rain and hydraulic ram is a dual function rain that both adjusts the position of the vessel in steps "j" and "k" when it is reclined on the railer and changes elevation of the vessel when the vessel is lowered in step "m".

64. The method of claim 59 wherein step "b" comprises in part providing a vessel that has an upper bulk material holding section and a lower foundation section that does not hold any bulk material.

65. The method of claim 59 wherein step "l" includes moving the vessel with one or more hydraulic rains.

66. The method of claim 65 wherein there are a plurality of hydraulic rams on the trailer, at least one ram being positioned to move the vessel longitudinally on the trailer when the vessel is in the generally horizontal position on the trailer, and further comprising the step of moving the vessel longitudinally on the trailer between steps "k" and "l".

67. The method of claim 59 further comprising the step of moving the vessel longitudinally on the trailer between steps "k" and "l".

68. The method of claim 59 wherein step "b" comprises providing a vessel that has an upper generally cylindrically shaped portion and a conical portion below the cylindrical portion, the cylindrical and conical portions having a common interior for holding bulk material.

69. The method of claim 59, wherein in step "b" the vessel comprises a plurality of corner castings and in step "e" the second trailer comprises a plurality of twist locks, and in step "j" each corner casting is locked in one of the twist locks.

70. The method of claim 59 wherein in step "e" the second trailer is comprised of a wheeled chassis and a masted elevator movably attached to the chassis, and in steps "I" and "J" the vessel is connected to the elevator and step "l" includes moving the elevator and the vessel together from a generally horizontal to a generally upright position.

71. The method of claim 70 wherein one or more hydraulic rams connect the elevator to the wheeled chassis.

72. The method of claim 71 wherein the elevator is pinned to the chassis at a pinned connection and further comprising the step of pivoting the elevator about the pinned connection in step "l".

73. The method of claim 71 wherein the elevator and vessel have respective connecting portions and further comprising the step of engaging the connecting portions before step "l".

74. The method of claim 73 wherein the connecting portions enable the elevator to hold the vessel in an elevated position that spaces the vessel above the chassis and further comprising simultaneously lowering the connecting portions and the vessel as part of step "l".

75. The method of claim 74 wherein at least one hydraulic ram on the elevator lowers the connecting portions and vessel as part of step "l".

76. The method of claim 59 wherein in step "b" the vessel is a curve sided container.

77. The method of claim 59 wherein the vessel is filled with between 1 and 50,000 pounds of bulk material in step "f".

78. The method of claim 59 wherein in step "e" the second trailer includes a trailer chassis and a plurality of wheels, and further comprising the step of adjusting the position of the vessel longitudinally along the trailer chassis relative to the trailer wheels before step "l".

79. The method of claim 78 further comprising supporting the second trailer chassis with outriggers at the rear end portion of the second trailer.

80. The method of claim 59 wherein the first trailer has a chassis and a plurality of wheels having front and rear end portions and including the step of moving the vessel longitudinally on the chassis relative to the wheels before step "g".

81. The method of claim 80 further comprising supporting the first trailer chassis with outriggers at the rear end portion of the first trailer.

82. The method of claim 59 further comprising supporting the second trailer with outriggers in step "l".

83. The method of claim 59, wherein in step "l" the vessel is loaded onto the second trailer using a crane.

84. The method of claim 59, wherein in step "h" the vessel is removably attached to a rail frame and the rail frame is removably attached to the rail car.

85. The method of claim 84, wherein the rail frame is removably attached to the rail car with a plurality of corner castings and twist locks.

86. The method of claim 85, wherein the vessel is removably attached to the rail frame with a plurality of corner castings and twist locks, and with a locking plate.

87. The method of claim 84, wherein in step "b" the vessel comprises a plurality of corner castings and the trailer comprises a plurality of twist locks, and in step "e" each corner casting is locked in one of the twist locks.

* * * * *